(12) United States Patent
Saishu et al.

(10) Patent No.: US 8,125,513 B2
(45) Date of Patent: Feb. 28, 2012

(54) STEREOSCOPIC DISPLAY DEVICE AND DISPLAY METHOD

(75) Inventors: Tatsuo Saishu, Tokyo (JP); Rieko Fukushima, Tokyo (JP); Kazuki Taira, Tokyo (JP); Yuzo Hirayama, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/926,136

(22) Filed: Oct. 27, 2010

(65) Prior Publication Data

US 2011/0043615 A1    Feb. 24, 2011

Related U.S. Application Data

(62) Division of application No. 10/935,626, filed on Sep. 8, 2004, now Pat. No. 7,834,903.

(30) Foreign Application Priority Data

Sep. 8, 2003 (JP) ................................. 2003-315356

(51) Int. Cl.
*H04N 13/00* (2006.01)
*H04N 13/02* (2006.01)
*H04N 13/04* (2006.01)

(52) U.S. Cl. ............... 348/42; 348/51; 348/52; 348/53; 348/54; 348/55

(58) Field of Classification Search ............... 348/42–60
See application file for complete search history.

(56) References Cited

U.S. PATENT DOCUMENTS

| 4,526,439 A | 7/1985 | Okoshi et al. |
| 5,349,379 A | 9/1994 | Eichenlaub |

(Continued)

FOREIGN PATENT DOCUMENTS

JP     7-15752    1/1995

(Continued)

OTHER PUBLICATIONS

Saishu et al., U.S. Appl. No. 10/809,512, filed Mar. 26, 2004.

*Primary Examiner* — Christopher S Kelley
*Assistant Examiner* — Chikaodili E Anyikire
(74) *Attorney, Agent, or Firm* — Finnegan, Henderson, Farabow, Garrett & Dunner, L.L.P.

(57) ABSTRACT

It is made possible to satisfy such a condition that moire or color moire is suppressed and a fast image processing is made easy and such a condition that sufficient image quality can be obtained both at a flat image display time and at a stereoscopic image display time simultaneously. A vertical period of pixel rows having the pixels arranged in one row in a lateral direction is three times a lateral period of the pixels, the pixels developing red, green and blue are alternately arranged in a lateral direction in the same row, the pixels in one row of two rows adjacent in a vertical direction are arranged such that lateral positions thereof are shifted to the pixels in the other row by ½ of the lateral period of the pixels, the pixels in rows adjacent in the same column through one row interposed therebetween are the pixels developing different colors of red, green and blue, and a pitch of the elemental images is equal to a width of 18n (n=1, 2, 3 . . . ) pieces of the pixels, and a lateral pitch of the beam control element is smaller than the width of the 18n pieces of the pixels.

8 Claims, 37 Drawing Sheets

U.S. PATENT DOCUMENTS

| | | | |
|---|---|---|---|
| 6,064,424 A * | 5/2000 | van Berkel et al. ............. 348/51 |
| 6,437,915 B2 | 8/2002 | Moseley et al. |
| 6,603,504 B1 | 8/2003 | Son et al. |
| 6,618,437 B1 | 9/2003 | Yamamoto |
| 6,741,031 B2 | 5/2004 | Harada et al. |
| 6,741,307 B2 | 5/2004 | Matsunaga et al. |
| 7,317,494 B2 | 1/2008 | Mashitani et al. |
| 2001/0053004 A1 | 12/2001 | Nishikawa et al. |
| 2002/0114077 A1 | 8/2002 | Javidi |
| 2003/0020682 A1 | 1/2003 | Tamaki |
| 2005/0105179 A1 | 5/2005 | Taira et al. |

FOREIGN PATENT DOCUMENTS

| | | |
|---|---|---|
| JP | 7-104212 | 4/1995 |
| JP | 8-149520 | 6/1996 |
| JP | 9-22006 | 1/1997 |
| JP | 9-49986 | 2/1997 |
| JP | 2001-501073 | 1/2001 |

* cited by examiner

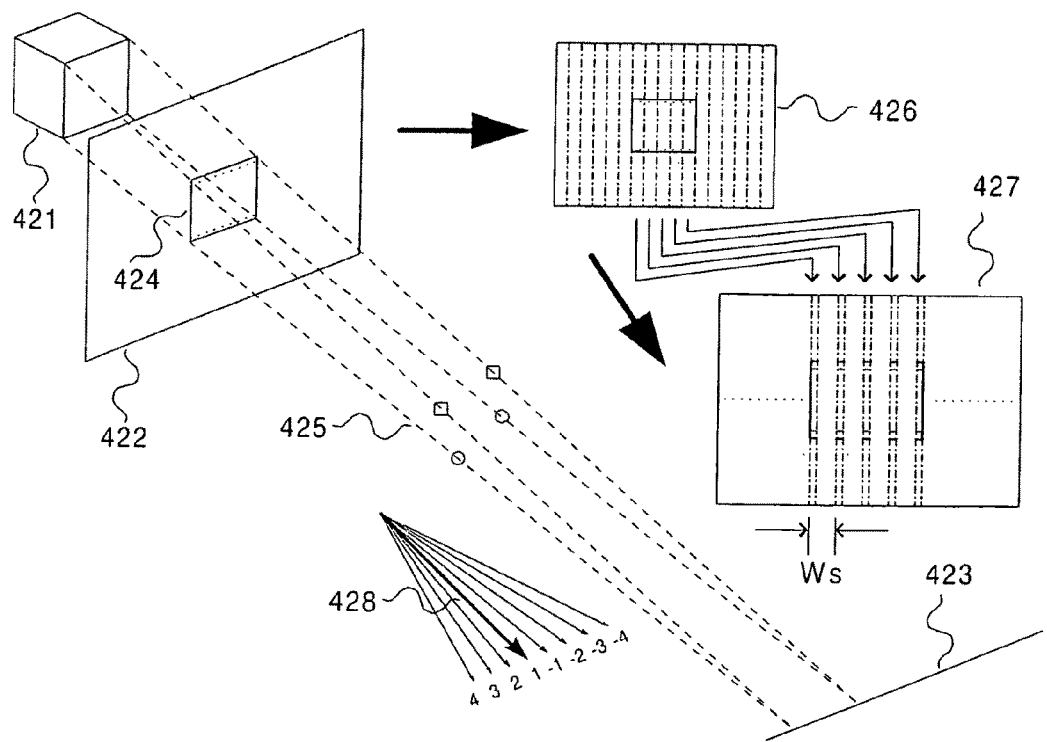
F I G. 16

| View Number | Slit Number Start | End | 3D-Pixel Number Start | End | Width | LCD SubPixel Number Start | row | End | row | LCD Pixel Number Start | row | End | row |
|---|---|---|---|---|---|---|---|---|---|---|---|---|---|
| -37 | -159 | -155 | 2 | 6 | 5 | 9 | 1 | 81 | 1 | 3 | 1 | 27 | 1 |
| -36 | -159 | -146 | 2 | 15 | 14 | 10 | 0 | 244 | 0 | 4 | 0 | 82 | 0 |
| -35 | -159 | -138 | 2 | 23 | 22 | 10 | 1 | 388 | 1 | 4 | 1 | 130 | 1 |
| -34 | -159 | -130 | 2 | 31 | 30 | 11 | 0 | 533 | 0 | 4 | 0 | 178 | 0 |
| -33 | -159 | -121 | 2 | 40 | 39 | 11 | 1 | 695 | 1 | 4 | 1 | 232 | 1 |
| -32 | -159 | -113 | 2 | 48 | 47 | 12 | 0 | 840 | 0 | 4 | 0 | 280 | 0 |
| -31 | -159 | -105 | 2 | 56 | 55 | 12 | 1 | 984 | 1 | 4 | 1 | 328 | 1 |
| -30 | -159 | -96 | 2 | 65 | 64 | 13 | 0 | 1147 | 0 | 5 | 0 | 383 | 0 |
| -29 | -159 | -88 | 2 | 73 | 72 | 13 | 1 | 1291 | 1 | 5 | 1 | 431 | 1 |
| -28 | -159 | -80 | 2 | 81 | 80 | 14 | 0 | 1436 | 0 | 5 | 0 | 479 | 0 |
| -27 | -159 | -71 | 2 | 90 | 89 | 14 | 1 | 1598 | 1 | 5 | 1 | 533 | 1 |
| -26 | -159 | -63 | 2 | 98 | 97 | 15 | 0 | 1743 | 0 | 5 | 0 | 581 | 0 |
| -25 | -159 | -55 | 2 | 106 | 105 | 15 | 1 | 1887 | 1 | 5 | 1 | 629 | 1 |
| -24 | -159 | -46 | 2 | 115 | 114 | 16 | 0 | 2050 | 0 | 6 | 0 | 684 | 0 |
| -23 | -159 | -38 | 2 | 123 | 122 | 16 | 1 | 2194 | 1 | 6 | 1 | 732 | 1 |
| -22 | -159 | -30 | 2 | 131 | 130 | 17 | 0 | 2339 | 0 | 6 | 0 | 780 | 0 |
| -21 | -159 | -21 | 2 | 140 | 139 | 17 | 1 | 2501 | 1 | 6 | 1 | 834 | 1 |
| -20 | -159 | -13 | 2 | 148 | 147 | 18 | 0 | 2646 | 0 | 6 | 0 | 882 | 0 |
| -19 | -159 | -5 | 2 | 156 | 155 | 18 | 1 | 2790 | 1 | 6 | 1 | 930 | 1 |
| -18 | -160 | 5 | 1 | 165 | 165 | 1 | 0 | 2953 | 0 | 1 | 0 | 985 | 0 |
| -17 | -160 | 13 | 1 | 173 | 173 | 1 | 1 | 3097 | 1 | 1 | 1 | 1033 | 1 |
| -16 | -160 | 21 | 1 | 181 | 181 | 2 | 0 | 3242 | 0 | 1 | 0 | 1081 | 0 |
| -15 | -160 | 30 | 1 | 190 | 190 | 2 | 1 | 3404 | 1 | 1 | 1 | 1135 | 1 |
| -14 | -160 | 38 | 1 | 198 | 198 | 3 | 0 | 3549 | 0 | 1 | 0 | 1183 | 0 |
| -13 | -160 | 46 | 1 | 206 | 206 | 3 | 1 | 3693 | 1 | 1 | 1 | 1231 | 1 |
| -12 | -160 | 55 | 1 | 215 | 215 | 4 | 0 | 3856 | 0 | 2 | 0 | 1286 | 0 |
| -11 | -160 | 63 | 1 | 223 | 223 | 4 | 1 | 4000 | 1 | 2 | 1 | 1334 | 1 |
| -10 | -160 | 71 | 1 | 231 | 231 | 5 | 0 | 4145 | 0 | 2 | 0 | 1382 | 0 |
| -9 | -160 | 80 | 1 | 240 | 240 | 5 | 1 | 4307 | 1 | 2 | 1 | 1436 | 1 |
| -8 | -160 | 88 | 1 | 248 | 248 | 6 | 0 | 4452 | 0 | 2 | 0 | 1484 | 0 |
| -7 | -160 | 96 | 1 | 256 | 256 | 6 | 1 | 4596 | 1 | 2 | 1 | 1532 | 1 |
| -6 | -160 | 105 | 1 | 265 | 265 | 7 | 0 | 4759 | 0 | 3 | 0 | 1587 | 0 |
| -5 | -160 | 113 | 1 | 273 | 273 | 7 | 1 | 4903 | 1 | 3 | 1 | 1635 | 1 |
| -4 | -160 | 121 | 1 | 281 | 281 | 8 | 0 | 5048 | 0 | 3 | 0 | 1683 | 0 |
| -3 | -160 | 130 | 1 | 290 | 290 | 8 | 1 | 5210 | 1 | 3 | 1 | 1737 | 1 |
| -2 | -160 | 138 | 1 | 298 | 298 | 9 | 0 | 5355 | 0 | 3 | 0 | 1785 | 0 |
| -1 | -155 | 146 | 6 | 306 | 301 | 99 | 1 | 5499 | 1 | 33 | 1 | 1833 | 1 |
| 1 | -146 | 155 | 15 | 315 | 301 | 262 | 0 | 5662 | 0 | 88 | 0 | 1888 | 0 |
| 2 | -138 | 160 | 23 | 320 | 298 | 406 | 1 | 5752 | 1 | 136 | 1 | 1918 | 1 |
| 3 | -130 | 160 | 31 | 320 | 290 | 551 | 0 | 5753 | 0 | 184 | 0 | 1918 | 0 |
| 4 | -121 | 160 | 40 | 320 | 281 | 713 | 1 | 5753 | 1 | 238 | 1 | 1918 | 1 |
| 5 | -113 | 160 | 48 | 320 | 273 | 858 | 0 | 5754 | 0 | 286 | 0 | 1918 | 0 |
| 6 | -105 | 160 | 56 | 320 | 265 | 1002 | 1 | 5754 | 1 | 334 | 1 | 1918 | 1 |
| 7 | -96 | 160 | 65 | 320 | 256 | 1165 | 0 | 5755 | 0 | 389 | 0 | 1919 | 0 |
| 8 | -88 | 160 | 73 | 320 | 248 | 1309 | 1 | 5755 | 1 | 437 | 1 | 1919 | 1 |
| 9 | -80 | 160 | 81 | 320 | 240 | 1454 | 0 | 5756 | 0 | 485 | 0 | 1919 | 0 |
| 10 | -71 | 160 | 90 | 320 | 231 | 1616 | 1 | 5756 | 1 | 539 | 1 | 1919 | 1 |
| 11 | -63 | 160 | 98 | 320 | 223 | 1761 | 0 | 5757 | 0 | 587 | 0 | 1919 | 0 |
| 12 | -55 | 160 | 106 | 320 | 215 | 1905 | 1 | 5757 | 1 | 635 | 1 | 1919 | 1 |
| 13 | -46 | 160 | 115 | 320 | 206 | 2068 | 0 | 5758 | 0 | 690 | 0 | 1920 | 0 |
| 14 | -38 | 160 | 123 | 320 | 198 | 2212 | 1 | 5758 | 1 | 738 | 1 | 1920 | 1 |
| 15 | -30 | 160 | 131 | 320 | 190 | 2357 | 0 | 5759 | 0 | 786 | 0 | 1920 | 0 |
| 16 | -21 | 160 | 140 | 320 | 181 | 2519 | 1 | 5759 | 1 | 840 | 1 | 1920 | 1 |
| 17 | -13 | 160 | 148 | 320 | 173 | 2664 | 0 | 5760 | 0 | 888 | 0 | 1920 | 0 |
| 18 | -5 | 160 | 156 | 320 | 165 | 2808 | 1 | 5760 | 1 | 936 | 1 | 1920 | 1 |
| 19 | 5 | 159 | 165 | 319 | 155 | 2971 | 0 | 5743 | 0 | 991 | 0 | 1915 | 0 |
| 20 | 13 | 159 | 173 | 319 | 147 | 3115 | 1 | 5743 | 1 | 1039 | 1 | 1915 | 1 |
| 21 | 21 | 159 | 181 | 319 | 139 | 3260 | 0 | 5744 | 0 | 1087 | 0 | 1915 | 0 |
| 22 | 30 | 159 | 190 | 319 | 130 | 3422 | 1 | 5744 | 1 | 1141 | 1 | 1915 | 1 |
| 23 | 38 | 159 | 198 | 319 | 122 | 3567 | 0 | 5745 | 0 | 1189 | 0 | 1915 | 0 |
| 24 | 46 | 159 | 206 | 319 | 114 | 3711 | 1 | 5745 | 1 | 1237 | 1 | 1915 | 1 |
| 25 | 55 | 159 | 215 | 319 | 105 | 3874 | 0 | 5746 | 0 | 1292 | 0 | 1916 | 0 |
| 26 | 63 | 159 | 223 | 319 | 97 | 4018 | 1 | 5746 | 1 | 1340 | 1 | 1916 | 1 |
| 27 | 71 | 159 | 231 | 319 | 89 | 4163 | 0 | 5747 | 0 | 1388 | 0 | 1916 | 0 |
| 28 | 80 | 159 | 240 | 319 | 80 | 4325 | 1 | 5747 | 1 | 1442 | 1 | 1916 | 1 |
| 29 | 88 | 159 | 248 | 319 | 72 | 4470 | 0 | 5748 | 0 | 1490 | 0 | 1916 | 0 |
| 30 | 96 | 159 | 256 | 319 | 64 | 4614 | 1 | 5748 | 1 | 1538 | 1 | 1916 | 1 |
| 31 | 105 | 159 | 265 | 319 | 55 | 4777 | 0 | 5749 | 0 | 1593 | 0 | 1917 | 0 |
| 32 | 113 | 159 | 273 | 319 | 47 | 4921 | 1 | 5749 | 1 | 1641 | 1 | 1917 | 1 |
| 33 | 121 | 159 | 281 | 319 | 39 | 5066 | 0 | 5750 | 0 | 1689 | 0 | 1917 | 0 |
| 34 | 130 | 159 | 290 | 319 | 30 | 5228 | 1 | 5750 | 1 | 1743 | 1 | 1917 | 1 |
| 35 | 138 | 159 | 298 | 319 | 22 | 5373 | 0 | 5751 | 0 | 1791 | 0 | 1917 | 0 |
| 36 | 146 | 159 | 306 | 319 | 14 | 5517 | 1 | 5751 | 1 | 1839 | 1 | 1917 | 1 |
| 37 | 155 | 159 | 315 | 319 | 5 | 5680 | 0 | 5752 | 0 | 1894 | 0 | 1918 | 0 |

| View Number | Slit Number Start | End | 3D-Pixel Number Start | End | Width | LCD SubPixel Number Start | End | LCD Pixel Number Start | End |
|---|---|---|---|---|---|---|---|---|---|
| -17 | -159 | -146 | 2 | 15 | 14 | 11 | 245 | 4 | 82 |
| -16 | -159 | -127 | 2 | 34 | 33 | 12 | 588 | 4 | 196 |
| -15 | -159 | -107 | 2 | 54 | 53 | 13 | 949 | 5 | 317 |
| -14 | -159 | -88 | 2 | 73 | 72 | 14 | 1292 | 5 | 431 |
| -13 | -159 | -69 | 2 | 92 | 91 | 15 | 1635 | 5 | 545 |
| -12 | -159 | -49 | 2 | 112 | 111 | 16 | 1996 | 6 | 666 |
| -11 | -159 | -30 | 2 | 131 | 130 | 17 | 2339 | 6 | 780 |
| -10 | -159 | -10 | 2 | 151 | 150 | 18 | 2700 | 6 | 900 |
| -9 | -160 | 10 | 1 | 170 | 170 | 1 | 3043 | 1 | 1015 |
| -8 | -160 | 30 | 1 | 190 | 190 | 2 | 3404 | 1 | 1135 |
| -7 | -160 | 49 | 1 | 209 | 209 | 3 | 3747 | 1 | 1249 |
| -6 | -160 | 69 | 1 | 229 | 229 | 4 | 4108 | 2 | 1370 |
| -5 | -160 | 88 | 1 | 248 | 248 | 5 | 4451 | 2 | 1484 |
| -4 | -160 | 107 | 1 | 267 | 267 | 6 | 4794 | 2 | 1598 |
| -3 | -160 | 127 | 1 | 287 | 287 | 7 | 5155 | 3 | 1719 |
| -2 | -160 | 146 | 1 | 306 | 306 | 8 | 5498 | 3 | 1833 |
| -1 | -160 | 160 | 1 | 320 | 320 | 9 | 5751 | 3 | 1917 |
| 1 | -160 | 160 | 1 | 320 | 320 | 10 | 5752 | 4 | 1918 |
| 2 | -146 | 160 | 15 | 320 | 306 | 263 | 5753 | 88 | 1918 |
| 3 | -127 | 160 | 34 | 320 | 287 | 606 | 5754 | 202 | 1918 |
| 4 | -107 | 160 | 54 | 320 | 267 | 967 | 5755 | 323 | 1919 |
| 5 | -88 | 160 | 73 | 320 | 248 | 1310 | 5756 | 437 | 1919 |
| 6 | -69 | 160 | 92 | 320 | 229 | 1653 | 5757 | 551 | 1919 |
| 7 | -49 | 160 | 112 | 320 | 209 | 2014 | 5758 | 672 | 1920 |
| 8 | -30 | 160 | 131 | 320 | 190 | 2357 | 5759 | 786 | 1920 |
| 9 | -10 | 160 | 151 | 320 | 170 | 2718 | 5760 | 906 | 1920 |
| 10 | 10 | 159 | 170 | 319 | 150 | 3061 | 5743 | 1021 | 1915 |
| 11 | 30 | 159 | 190 | 319 | 130 | 3422 | 5744 | 1141 | 1915 |
| 12 | 49 | 159 | 209 | 319 | 111 | 3765 | 5745 | 1255 | 1915 |
| 13 | 69 | 159 | 229 | 319 | 91 | 4126 | 5746 | 1376 | 1916 |
| 14 | 88 | 159 | 248 | 319 | 72 | 4469 | 5747 | 1490 | 1916 |
| 15 | 107 | 159 | 267 | 319 | 53 | 4812 | 5748 | 1604 | 1916 |
| 16 | 127 | 159 | 287 | 319 | 33 | 5173 | 5749 | 1725 | 1917 |
| 17 | 146 | 159 | 306 | 319 | 14 | 5516 | 5750 | 1839 | 1917 |

| NUMBER OF PARALLAXES (WITHIN ONE ROW) Ps/Pp or Pe/Pp | CF ARRANGEMENT | LENTICULAR(OPTICAL OPENING)DIRECTION | SQUARE PIXEL AT 3D DISPLAY TIME | SQUARE ARRANGEMENT AT 3D DISPLAY TIME | COLOR DISTRIBUTION OF PARALLAX IMAGE |
|---|---|---|---|---|---|
| 3n+1, 3n+2 (+1/2) | STRIPE | VERTICAL (WITH A DIFFUSION LAYER) | × | × | × |
| 3n+1, 3n+2 (+1/2) | STRIPE | OBLIQUE | × | × | △ |
| 3n+1, 3n+2 (+1/2) | MOSAIC | VERTICAL (WITH A DIFFUSION LAYER) | × | × | ○ |
| 3n+1, 3n+2 (+1/2) | MOSAIC | OBLIQUE | × | × | ○ |
| 3n+1, 3n+2 (+1/2) | DELTA | VERTICAL | × | × | × |
| 3n+1, 3n+2 (+1/2) | MOSAIC-DELTA | VERTICAL | × | × | △ |
| 3n (n!=3, 6, 9, ...) | STRIPE | VERTICAL (WITH A DIFFUSION LAYER) | ○ | ○ | × |
| 3n (n!=3, 6, 9, ...) | STRIPE | OBLIQUE | ○ | × | △ |
| 3n (n!=3, 6, 9, ...) | MOSAIC | VERTICAL (WITH A DIFFUSION LAYER) | ○ | ○ | ○ |
| 3n (n!=3, 6, 9, ...) | MOSAIC | OBLIQUE | ○ | × | ○ |
| 3n (n!=3, 6, 9, ...) | DELTA | VERTICAL | ○ | ○○ | × |
| 3n (n!=3, 6, 9, ...) | MOSAIC-DELTA | VERTICAL | ○ | ○○ | △ |
| 9n (n!=2, 4, 6, ...) | STRIPE | VERTICAL (WITH A DIFFUSION LAYER) | ○ | ○ | × |
| 9n (n!=2, 4, 6, ...) | STRIPE | OBLIQUE | ○ | × | △ |
| 9n (n!=2, 4, 6, ...) | MOSAIC | VERTICAL (WITH A DIFFUSION LAYER) | ○ | ○ | ○ |
| 9n (n!=2, 4, 6, ...) | MOSAIC | OBLIQUE | ○ | × | ○ |
| 9n (n!=2, 4, 6, ...) | DELTA | VERTICAL | ○ | ○○ | × |
| 9n (n!=2, 4, 6, ...) | MOSAIC-DELTA | VERTICAL | ○ | ○○ | △ |
| 18n | STRIPE | VERTICAL (WITH A DIFFUSION LAYER) | ○ | ○ | × |
| 18n | STRIPE | OBLIQUE | ○ | × | △ |
| 18n | MOSAIC | VERTICAL (WITH A DIFFUSION LAYER) | ○ | ○ | ○ |
| 18n | MOSAIC | OBLIQUE | ○ | × | ○ |
| 18n | DELTA | VERTICAL | ○ | ○○ | × |
| 18n | MOSAIC-DELTA | VERTICAL | ○ | ○○ | ○ |

FIG. 30

DELTA/MOSAIC-DELTA
NUMBER OF PARALLAXES:36

| LCD PIXELS | | NUMBER OF PARALLAX ALLOCATIONS | | AT 3D DISPLAY TIME | | | | SIMILAR STANDARDS | | | | |
|---|---|---|---|---|---|---|---|---|---|---|---|---|
| NUMBER OF COLUMNS | NUMBER OF ROWS | NUMBER OF COLUMNS | NUMBER OF ROWS | NUMBER OF COLUMNS | EXCESS COLUMNS | NUMBER OF ROWS | EXCESS ROWS | | NUMBER OF COLUMNS | NUMBER OF EXCESS 3D COLUMNS | NUMBER OF ROWS | NUMBER OF EXCESS 3D ROWS |
| 1600 | 1200 | 9600 | 600 | 266 | 24 | 200 | 0 | | | | | |
| 1920 | 1200 | 11520 | 600 | 320 | 0 | 200 | 0 | | | | | |
| 2048 | 1536 | 12288 | 768 | 340 | 48 | 256 | 0 | 1/4VGA | 320 | 20 | 240 | 16 |
| 3200 | 2400 | 19200 | 1200 | 532 | 48 | 400 | 0 | 1/4XGA | 512 | 20 | 384 | 16 |

FIG. 31A

MOSAIC
NUMBER OF PARALLAXES 18

| LCD PIXELS | | NUMBER OF PARALLAX ALLOCATIONS | | AT 3D DISPLAY TIME | | | | SIMILAR STANDARDS | | | | |
|---|---|---|---|---|---|---|---|---|---|---|---|---|
| NUMBER OF COLUMNS | NUMBER OF ROWS | NUMBER OF COLUMNS | NUMBER OF ROWS | NUMBER OF COLUMNS | EXCESS COLUMNS | NUMBER OF ROWS | EXCESS ROWS | | NUMBER OF COLUMNS | NUMBER OF EXCESS 3D COLUMNS | NUMBER OF ROWS | NUMBER OF EXCESS 3D ROWS |
| 1600 | 1200 | 9600 | 1200 | 532 | 24 | 400 | 0 | 1/4XGA | 512 | 20 | 384 | 16 |
| 1920 | 1200 | 11520 | 1200 | 640 | 0 | 400 | 0 | 1/4WXGA | 640 | 0 | 384 | 16 |
| 2048 | 1536 | 12288 | 1536 | 682 | 12 | 512 | 0 | VGA | 640 | 42 | 480 | 32 |
| 3200 | 2400 | 19200 | 2400 | 1066 | 12 | 800 | 0 | XGA | 1024 | 42 | 768 | 32 |

FIG. 31B

STEREOSCOPIC DISPLAY DEVICE AND DISPLAY METHOD

CROSS-REFERENCE TO RELATED APPLICATIONS

This is a division of application Ser. No. 10/935,626, filed Sep. 8, 2004 now U.S. Pat. No. 7,834,903, which is incorporated herein by reference.

This application is based upon and claims the benefit of priority from the prior Japanese Patent Application No. 2003-315356, filed on Sep. 8, 2003 in Japan, the entire contents of which are incorporated herein by reference.

BACKGROUND OF THE INVENTION

1. Field of the Invention

The present invention relates to a stereoscopic display device and a display method.

2. Related Art

As a stereoscopic image or motion picture display device allowing display of a motion picture, so-called "a three-dimensional display", ones of various systems have been known. In recent years, particularly, a demand for a display device of a flat panel type employing a system where dedicated eyeglasses or the like are not used is increasing. As a stereoscopic motion picture display device of such a type, there is known one using a principle of holography, which is difficult to be put in a practical use. A system where a beam controlling element is installed just in front of a display panel (a display device) whose pixel positions are fixed, such as a liquid crystal display device of a direct view type or a projection type or a plasma display device is known as a system which can be realized relatively easily. In this connection, the beam controlling element serves to control beams from the display panel to direct them to an observer.

The beam controlling element is generally called "a parallax barrier", and it controls beams such that different images are seen according to an angle change even at one or the same position on the beam control element. Specifically, when only a left and right parallax (horizontal disparity) is applied, a slit or a lenticular sheet (a cylindrical lens array) is used, and when a vertical disparity is also included, a pinhole array or a lens array is used. The systems using the parallax barrier are also classified to a binocular system, a multiview system, an ultra-multiview system, an integral photography (hereinafter, also called "IP") system. A basic principle common to these types is substantially the same as that used in a stereoscopic photograph invented about a hundred years ago.

In general, it is considered that a difference between the IP system and an LS (lenticular sheet) system is based upon whether pixels are present on an image plane or on a focal plane. In an actual design, particularly, in a case that there are many pixels, however, the difference between the image plane and the focal plane is in a range of 0.1 mm or less, even if there is no aberration, which not only makes it difficult to make a discrimination therebetween regarding precision but also makes it difficult to make a discrimination between presence and absence of beam converging at a viewing distance. The IP system described in this text means such a constitution that discrimination between positions of an image plane and a focal plane is not made but a position of a lateral viewpoint where a normal stereoscopic image can be seen at the viewing distance is arbitrary or continuous. Further, the multiview system described in this text is not equivalent to the LS system but it means such a constitution that a position of a lateral viewpoint where a normal stereoscopic image can be seen at the viewing distance is determined on the basis of an inter-pupilliary distance.

In both the IP system and the multiview system, since the viewing distance is usually finite, a display image is produced such that a perspective projection image at the viewing distance can be actually seen.

In the IP system, since a parallax barrier pitch Ps when viewed at a position of the eyes of an observer is not integer times a pixel-to-pixel pitch Pp, moire may be viewed when a black matrix is not ignored. In particular, when a slit or a lenticular sheet with a low aperture ratio of pixels in a horizontal direction is used, moire is easily seen. Even in the multiview system where the parallax barrier pitch Ps which can see at the viewing distance is integer times the pixel-to-pixel pitch Pp, when deviation occurs in a forward or rearward direction regarding the viewing distance, moire can see on a similar principle. However, it is known that, when the aperture ratio of pixels in a horizontal direction is 50% and the pixels have a delta arrangement, the moire can be cancelled and moire can be cancelled even in another pixel shape (for example, refer to Japanese Patent Laid-Open No. 7-15752). It is also known that moire is cancelled by inclining a lenticular sheet by an angle of about 9.5° (for example, refer to Japanese Patent Laid-Open No. 2001-501073). It is made possible to allocate parallaxes in a vertical direction, namely in two or more lines in a distributing manner by utilizing the delta arrangement or the lenticular sheet disposed obliquely, and such an advantage can also be obtained that the number of parallaxes is increased by reducing a difference in resolution between a vertical direction and a horizontal direction. Besides, it is known that moire or color moire can be reduced by using a diffusion film or defocusing (for example, refer to Japanese Patent Laid-Open No. 8-149520).

When a stereoscopic image is displayed, since original image data such as video images obtained by a plurality of cameras has a pixel arrangement constituted of a square arrangement like image data for an ordinary flat display and a shape of each pixel is square, it is desirable for conversion to a stereoscopic image conducted by fast image processing that effective pixels constitutes a square arrangement and each pixel itself is square even on a side of the stereoscopic display device. In the stereoscopic display device, in order to cause resolutions in a horizontal direction and in a vertical direction to match with each other, namely, in order to set an aspect ratio of effective pixels to 1, it is necessary to set the number of parallax to a multiple of 3, when a color filter has a stripe arrangement. However, when the number of parallaxes is set in this manner, there occurs a problem that color moire appears because a period of color of a color filter and a period of the parallax barrier along a horizontal direction are close to each other. As means for solving such a problem, there is proposed a method for shifting the number of parallaxes from the multiple of 3, but the aspect ratio of the effective pixel deviates from 1 in the method, which results in need for converting an image. As another solution, there has been proposed a method for applying a mosaic arrangement to a color filter.

Further, a system which allows switching of a stereoscopic display device between a stereoscopic display mode and a flat display mode has been disclosed. In such a disclosure, there have been known a method for performing switching of liquid crystal elements constituting a parallax barrier, a method for switching distances from a display plane of a lenticular sheet, a method of utilizing a liquid crystal lens, or the like.

As described above, in the conventional stereoscopic display devices, means for canceling moire have been disclosed in the above publications. However, it is a difficult problem that a aspect ratio of pixels is 1 and the pixels constitute a square arrangement for suppressing moire or color moire and attaining matching with a fast image processing, color data or information for each parallax is prevented from lacking, or a deviation in color distribution is canceled.

In the conventional stereoscopic display devices, there is still a problem that, when switching is performed between a flat image (two-dimensional) display and a stereoscopic image (three-dimensional) display, a resolution varies largely and an image quality at a time of flat display lowers due to deviation of a color distribution or the like.

SUMMARY OF THE INVENTION

The present invention has been made in view of these circumstances, and an object thereof is to a stereoscopic display device where, while suppressing moire or color moire, an aspect ratio of a pixel is set to 1 and simultaneously pixels constitute a square arrangement, and a resolution or an image quality is not changed largely even when switching is performed between a flat image display and a stereoscopic image display.

A stereoscopic display device according to a first aspect of the present invention includes: a display device having pixels developing either one color of red, green and blue which are disposed within a display plane; and a beam controlling element which is disposed at the front of the display device and has a plurality of apertures or a plurality of lenses having an optical opening portion extending linearly in vertical direction, controlling beam directions from the pixels to divide the display plane of the display device into elemental images corresponding to the respective apertures or lenses of the beam controlling element, wherein a vertical period of pixel rows comprising the pixels arranged in one row in a lateral direction is three times a lateral period of the pixels, the pixels developing red, green and blue are alternately arranged in a lateral direction in the same row, the pixels in one row of two rows adjacent in a vertical direction are arranged such that lateral positions thereof are shifted to the pixels in the other row by ½ of the lateral period of the pixels, the pixels in rows adjacent in the same column through one row interposed therebetween are the pixels developing different colors of red, green and blue; and a pitch of the elemental images is equal to a width of 18n (n=1, 2, 3 . . . ) pieces of the pixels, and a lateral pitch of the beam control element is smaller than the width of the 18n pieces of the pixels.

A stereoscopic display device according to a second aspect of the present invention includes: a display device having pixels developing either one color of red, green and blue which are disposed within a display plane; and a beam controlling element which is disposed at the front of the display device and has a plurality of apertures or a plurality of lenses having an optical opening portion extending linearly in vertical direction, controlling beam directions from the pixels to divide the display plane of the display device into elemental images corresponding to the respective apertures or lenses of the beam controlling element, wherein a vertical period of pixel rows comprising the pixels arranged in one row in a lateral direction is three times a lateral period of the pixels, the pixels developing red, green and blue are alternately arranged in a lateral direction in the same row, the pixels in one row of two rows adjacent in a vertical direction are arranged such that lateral positions thereof are shifted to the pixels in the other row by ½ of the lateral period of the pixels, the pixels in rows adjacent in the same column through one row interposed therebetween are the pixels developing different colors of red, green and blue, and an average value of pitches of the elemental images is larger than a width of 18n (n=1, 2, 3 . . . ) pieces of the pixels, and a lateral pitch of the beam controlling element is equal to a width of 18n pieces of the pixels.

A stereoscopic display device according to a third aspect of the present invention includes: a display device having pixels developing either one color of red, green and blue which are disposed within a display plane; a beam controlling element which is disposed at the front of the display device and has a plurality of apertures or a plurality of lenses having an optical opening portion extending linearly in vertical direction, controlling beam directions from the pixels to divide the display plane of the display device into elemental images corresponding to the respective apertures or lenses of the beam controlling element; and a diffusion layer having a haze of 20 or more to 70 or less, which is arranged between a pixel plane of the display device and the beam controlling element, wherein a vertical period of pixel rows comprising the pixels arranged in one row in a lateral direction is three times a lateral period of the pixels, the pixels developing red, green and blue are alternately arranged in a lateral direction in the same row, the pixels developing red, green and blue are alternately arranged in a vertical direction in the same column, and a pitch of the elemental images is equal to a width of 9n (n=1, 2, 3 . . . ) pieces of the pixels, and a lateral pitch of the beam control element is smaller than the width of the 9n pieces of the pixels.

A stereoscopic display device according to a fourth aspect of the present invention includes: a display device having pixels developing either one color of red, green and blue which are disposed within a display plane; a beam controlling element which is disposed at the front of the display device and has a plurality of apertures or a plurality of lenses having an optical opening portion extending linearly in vertical direction, controlling beam directions from the pixels to divide the display plane of the display device into elemental images corresponding to the respective apertures or lenses of the beam controlling element; and a diffusion layer having a haze of 20 or more to 70 or less, which is arranged between a pixel plane of the display device and the beam controlling element, wherein a vertical period of pixel rows comprising the pixels arranged in one row in a lateral direction is three times a lateral period of the pixels, the pixels developing red, green and blue are alternately arranged in a lateral direction in the same row, the pixels developing red, green and blue are alternately arranged in a vertical direction in the same column, and an average value of pitches of the elemental images is larger than a width of 9n (n=1, 2, 3 . . . ) pieces of the pixels, and a lateral pitch of the beam controlling element is equal to a width of 9n pieces of the pixels.

A display method using a stereoscopic display device of the first aspect of the present invention, the display method includes: by an effective pixel with a generally square shape comprising 6n×18n (n=1, 2, 3, . . . ) pixels arranged in a vertical direction and in a horizontal direction, applying the same parallax image information to 3n pixels arranged in a straight line in the same vertical direction as an extending direction of the opening portion of he beam controlling element and in the same position in a horizontal direction to display image signals as the total of 36n parallaxes at a stereoscopic image display time, and by an effective pixel with a generally square shape comprising 3 pixels of red, green and blue arranged laterally, ignoring a lateral positional deviation by ⅙ an effective pixel width and regarding the effective pixel as a square arrangement to display image signals at a flat image display time where the beam controlling element has been detached or a function thereof has been invalidated are performed.

A display method using a stereoscopic display device of the second aspect of the present invention, the display method includes: by an effective pixel with a square shape comprising 3n×9n (n=1, 2, 3, . . . ) pixels arranged in a vertical direction and in a horizontal direction, applying the same parallax image information to 3n pixels arranged in a straight line in the same vertical direction as an extending direction of the opening portion of he beam controlling element and in the same position in a horizontal direction to display image signals as the total of 9n parallaxes at a stereoscopic image display time, and by an effective pixel with a square shape comprising 3 pixels of red, green and blue arranged laterally, displaying image signals at a flat image display time where the beam controlling element has been detached or a function thereof has been invalidated are performed.

BRIEF DESCRIPTION OF THE DRAWINGS

FIG. 16 is an illustrative diagram showing an image composing method of the stereoscopic display device according to the first embodiment of the present invention;

FIG. 17 is a table showing one example of a parallax image allocation of the stereoscopic display device according to the first embodiment of the present invention;

FIG. 28 is a table showing one example of a parallax image allocation of the stereoscopic display device according to the second embodiment of the present invention;

FIG. 30 is a table for characteristic comparison of stereoscopic display devices according to one embodiment of the present invention and a comparative example;

FIG. 31A is a table showing one example of a pixel number allocation when a color filter arrangement is delta/mosaic delta, and FIG. 31B is a table showing one example of a pixel number allocation when a color filter arrangement is mosaic;

DETAILED DESCRIPTION OF THE INVENTION

A stereoscopic display device according to embodiments of the present invention will be explained below with reference to the drawings.

First Embodiment

Figure 1:
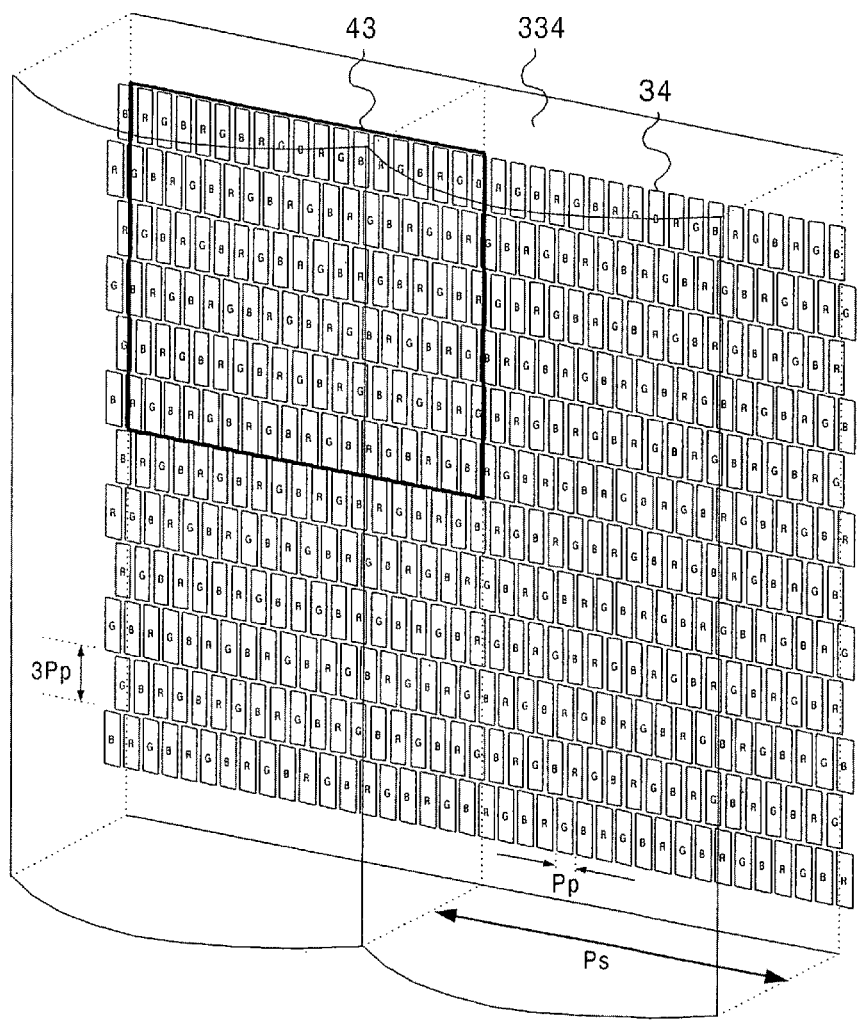
FIG. 1 is a perspective view schematically showing a pixel arrangement to which a first pixel arrangement example of a stereoscopic display device according to a first embodiment of the present invention is applied.

FIG. 1 is a perspective view schematically showing a constitution of a stereoscopic display device according to a first embodiment of the present invention.

Figure 5:
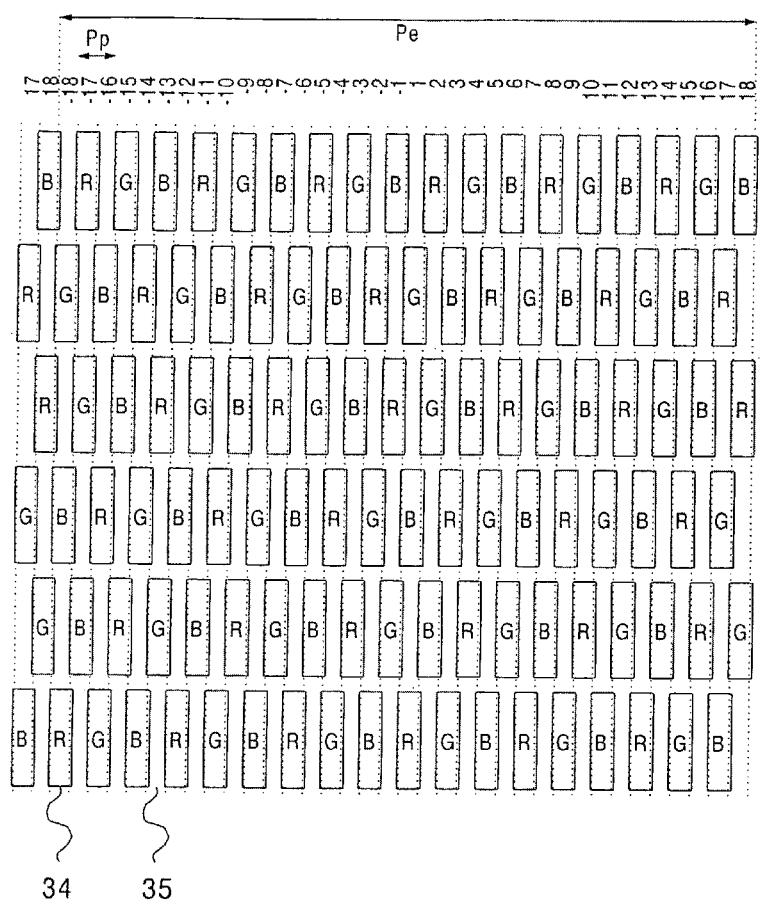
FIG. 5 is a plan view schematically showing a pixel arrangement on a display plane of the stereoscopic display device according to the first embodiment of the present invention is applied.
Figure 6:
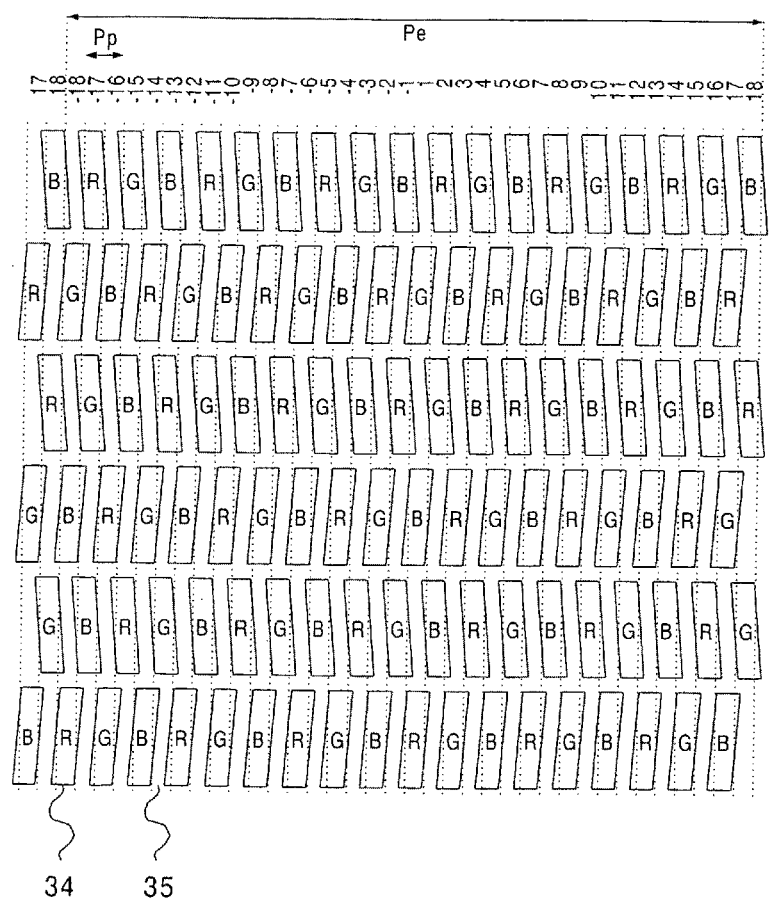
FIG. 6 is a plan view schematically showing another pixel arrangement on a display plane of the stereoscopic display device according to the first embodiment of the present invention is applied.

In such a stereoscopic display device as shown in FIG. 1, a lenticular sheet 334 constituted of cylindrical lenses having an optical aperture extending in a vertical direction is arranged as a beam controlling element at the front of a display plane of a flat parallax image display portion such as a liquid crystal panel. Since the optical aperture is neither oblique nor stepwise but it constitutes a straight line in a vertical direction, a pixel arrangement at a stereoscopic display time can easily be set to a square arrangement. Pixels 34 with an aspect ratio of 3:1 are arranged straightly in one line manner, and the respective pixels 34 are arranged such that red (R), green (G) and blue (B) are alternately positioned laterally in the same line on the display face. FIG. 5 and FIG. 6 are plan views showing examples of a pixel arrangement. In FIG. 5 and FIG. 6, numerals of −18 to 18 represent parallax numbers, and neighboring parallax numbers are allocated to neighboring rows. A vertical period of a pixel row is three times a lateral period Pp of pixels 34, and pixels 34 adjacent in a vertical direction are arranged such the lateral positions of the pixels 34 are arranged so as to be shifted by ½ of the lateral period of the pixels 34. Some of pixels 34 in adjacent or neighboring rows include adjacent pixels with the same color, but pixels 34 in rows adjacent to each other through one row interposed therebetween in the same column are pixels developing different colors.

Each pixel 34 has an opening portion or a light emitting portion at a fixed area ratio, and the opening portion is surrounded by black matrixes 35. Thus, arrangement of pixels is shifted between the adjacent rows, and the columns are formed in a zigzag manner. Accordingly, moire or color moire is canceled on the whole display area so that an image can be displayed.

A width of the opening portion in a horizontal direction is preferable to be equal to a width of a light shielding portion in a horizontal direction. However, when defocus or aberration of a lens, or a diffusion film attached to a polarizing plate (which is a constituent element for a liquid crystal panel) or the like between the display face and the lenticular sheet is present, the width of the opening portion in the horizontal direction is designed so not as to cause moire in view of these conditions.

Incidentally, in a color image display device which displays a color image, three pixels 34 of R, G and B constitute one effective pixel, namely, a minimum unit where luminance and color can be set arbitrarily. In general, each of R, G and B is frequently called "sub-pixel". In this text, a concept including the sub-pixel and pixel generally called will be explained hereinafter as a pixel 34.

Referring to FIG. 1 again, on the display plane shown in FIG. 1, one effective pixel 43 (one effective pixel is indicated with a black frame in FIG. 1) is constituted of pixels 34 comprising 18 columns and 6 rows. Since horizontal positions of pixels in a set of two adjacent rows are shifted from each other, a group of pixels at different 36 horizontal positions are present in the two rows, and three pixels arranged vertically on every other line for each horizontal position are present in the effective pixel 43. In such a display portion structure, a stereoscopic display which gives 36 parallaxes in a horizontal direction is made possible. Incidentally, when parallax is applied in a vertical direction too, such a constitution can be employed that a boundary of the effective pixel 43 in a horizontal direction is regarded as an elemental image boundary in a vertical direction, two parallaxes are allocated in the vertical direction, and the total of 72 parallaxes are applied by multiplying the parallaxes in the vertical direction by those in the horizontal direction.

FIG. 1 illustrates a portion near a central portion on the entire display plane, where a beam controlling element is positioned so as to generally face the front of the elemental image (the effective pixel 43).

In this display structure, a stereoscopic display with 36 parallaxes in a horizontal direction can be made possible. In the multiview system, there are 36 views, a elemental image pitch is a pitch of 18 pixels, or a 18-pixels pitch, and a lateral pitch of the beam controlling element becomes smaller than the 18-pixels pitch.

In the IP (integral photography) system, for example, when such a design is employed that the 18-pixels pitch is equal to the parallax barrier pitch Ps so that a set of parallel beams can be formed, the elemental image boundary occurs at a slightly larger interval (for example, 18.02) than a width of 18 pixels, or a 18-pixels width, so that the width of the effective pixel eventually corresponds to a width of 36 columns or a width of 37 columns depending on its position in the display face. That is, an average value of the elemental image pitches is larger than the width of 18 pixels and the lateral pitch of the beam controlling element 334 is the width of 18 pitches. Since the effective pixel 43 has an aspect ratio of 1 and it constitutes a square arrangement, displaying in a vertical direction can be conducted with substantially the same effective resolution as the horizontal direction. Therefore, production of a display image is made easy, and display data or information to be applied to each pixel can be obtained relatively fast. The resolution in the vertical direction is not required to match with that in the horizontal direction, the maximum resolution depends on a pixel row pitch, and displaying with substantially a higher resolution than that in the horizontal direction can be made. In such displaying, a resolution which an observer feels actually becomes higher than the effective horizontal resolution.

Figure 18:
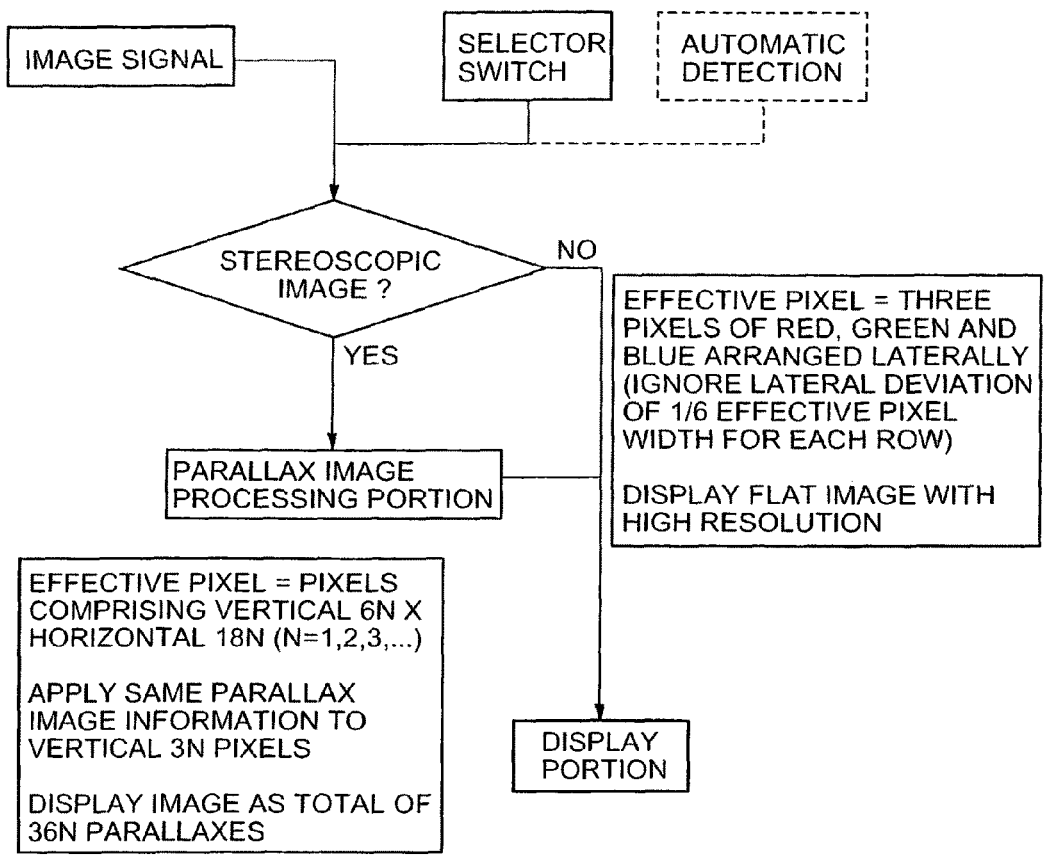
FIG. 18 is a flowchart showing a switching processing between a stereoscopic display and a flat display in the first embodiment of the present invention.

FIG. 18 is a flowchart showing a switching process between a stereoscopic display mode and a flat display mode. At a stereoscopic image display time, equal parallax image data or information is applied to three pixels arranged in a vertical direction in a straight line similar to a direction in which the opening portion of the beam controlling element extends and at the same position in a lateral direction by an effective pixel with a generally square shape comprising pixels of vertical 6 pieces×horizontal 18 pieces within the range of the effective pixel 43, so that image signals are applied as the total of 36 parallaxes and displaying is performed. At a flat image display time where the beam controlling element is detached or its function is invalidated, a lateral positional deviation of ⅙ effective pixel width for each row is ignored and the effective pixel is regarded as a square arrangement, so that image signals is applied to perform displaying by an effective pixel with a generally square shape comprising three pixels of red, green and blue arranged horizontally.

Thus, it is also made possible to change the resolution depending on display mode. As the switching method, there is a method where a selection signal is transmitted to a parallax image processing section by a manual switch or an automatic detection interlocked with attaching operation/detaching operation of the lenticular sheet. The parallax image processing section can be disposed in an image processing apparatus separated from a stereoscopic display device main body.

In the multiview system, for example, 36 views system, the elemental image pitch Pe is equal to a 18-pixel-to-pixel pitch Pp, but it is not generally an integer times the 18-pixel-to-pixel pitch Pp in the IP system. In the IP system, the parallax barrier pitch Ps is 18 times the 18-pixel-to-pixel pitch and the number of parallax reaches 36, the elemental image pitch Pe take a value (for example, 18.02) slightly larger than the 18-pixel-to-pixel pitch. Accordingly, strictly speaking, the resolution in the horizontal direction is slightly different from that in the vertical direction, but there occurs almost no problem even if both of them are practically handled as the same values.

Figure 2:
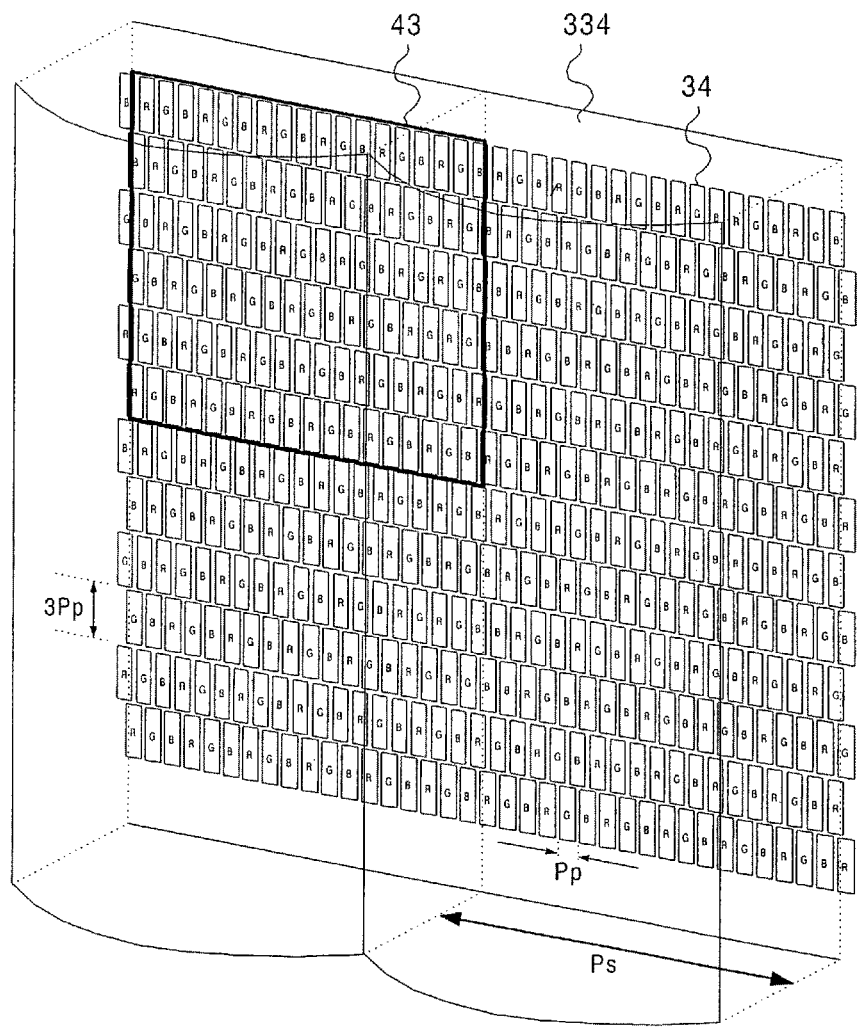
FIG. 2 is a perspective view schematically showing a pixel arrangement to which a second pixel arrangement example of a stereoscopic display device according to the first embodiment of the present invention is applied.
Figure 7A:
FIGS. 7A and 7B are views schematically showing examples of linear shapes at flat display times of the first and second image arrangement examples of the first embodiment of the present invention.
Figure 7B:
Figure 7C:
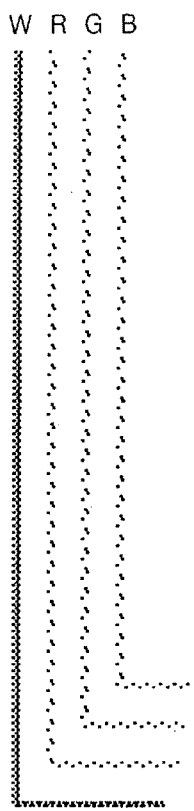
FIG. 7C is a view schematically showing an example of a linear shape at a flat display time of a comparative example.

In a display plane example shown in FIG. 2, such a constitution is employed that pixels 34 with same color are formed obliquely in a straight line, which is different from the example shown in FIG. 1. Even in this case, an object of the present invention is approximately achieved but the example shown in FIG. 1 is further preferable in view of a color distribution between parallax images at a stereoscopic display time or an image quality at a switching time to the flat displaying. At the switching time to the flat displaying, a lateral straight line display does not cause any problem in both the examples shown in FIG. 1 and FIG. 2, but a vertical straight line display causes such a difference as shown in FIGS. 7A and 7B. In the constitution shown in FIG. 2 corresponding to FIG. 7B, such a problem occurs that the vertical straight line display appears as an oblique line with steps. In FIGS. 7A, 7B and 7C, a letter "W" denotes white, "R" denotes red, "G" denotes green, and "B" denotes blue.

Figure 3:
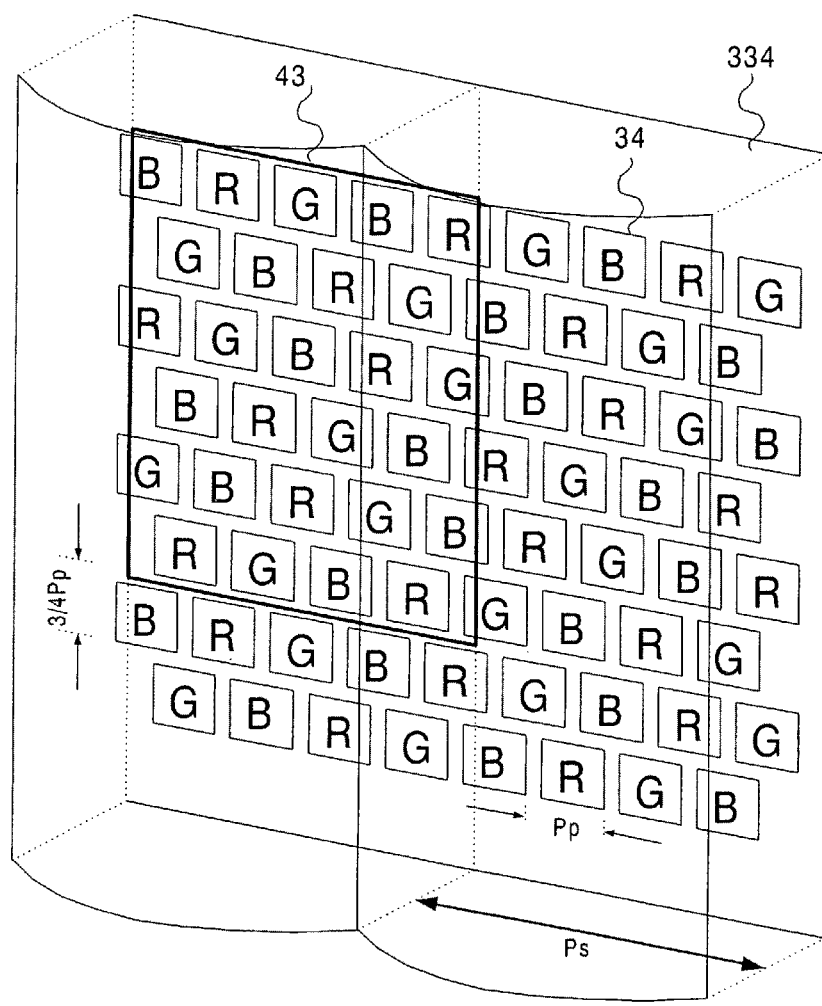
FIG. 3 is a perspective view schematically showing a pixel arrangement to which a pixel arranging method of a first comparative example to the first embodiment is applied.

A display plane example shown in FIG. 3 is a comparative example, where an aspect ratio of the pixel 34 is 3:4. This example has a pixel shape and a pixel arrangement called "a delta arrangement", but constitution is made for a parallax image (constituted of three pixels arranged vertically on every other line) at a stereoscopic display time to even color components such that pixels with the same color do not form a straight line obliquely. In this case, when the elemental image pitch or the parallax barrier pitch is a multiple of a pitch of 4.5 pixels, such conditions as a square pixel, a square arrangement, a color distribution, a horizontal parallax vertical allocation and the like can be satisfied. In the display plane shown in FIG. 3, however, since coarseness of a straight line in both vertical and horizontal directions is conspicuous especially at the time of switching to the flat image display, as shown in FIG. 7C, this display plane is not suitable for a high fineness information display and it does not meet an object of the present invention.

Figure 4:
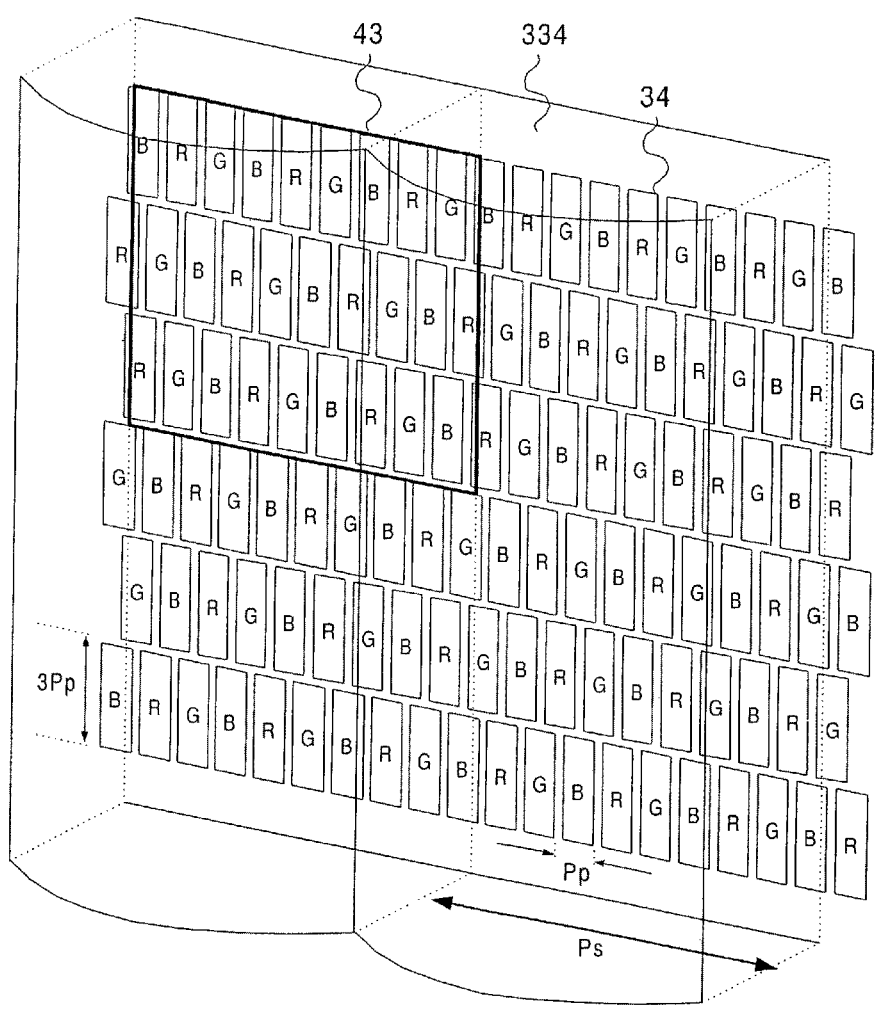
FIG. 4 is a perspective view schematically showing a pixel arrangement to which a pixel arranging method of a second comparative example to the first embodiment is applied.

A display plane example shown in FIG. 4 is a comparative example, where the elemental image pitch Pe or the parallax barrier pitch Ps is 9 times the pixel pitch Pp and the number of parallaxes is 18. In this case, when the effective pixel is formed in a square shape, as indicated by reference numeral 43, a color component and the number of pixels between parallax images appear as 2 or 1 alternately. Therefore, in order to eliminate lack in color component, a vertical size of the effective pixel must be increased to two times in a vertical direction, which does not match with the object of the present invention. Such a case that Pe or Ps is not a multiple of 18 but a multiple of 9 (for example, 27) is similar to the above.

A display plane example shown in FIG. 6 is an example where a shape of the opening portion has been changed without changing the center position of a pixel, as compared with the example shown in FIG. 5. A constitution of slightly changing the shape of an opening portion within a range where the center (the center of gravity) position of a pixel is not changed is not contrary to the spirit of the present invention. Similarly, a constitution of slightly changing the shape of the optical aperture of the beam controlling element too in a range where a relative position of the center (the center of gravity) to each pixel is not changed is not contrary to the spirit of the present invention.

A comparison table including the above embodiments and comparative examples and collectively describing differences in characteristics due to the number of parallaxes (per row), a color arrangement and an opening direction of the beam controlling element is shown in FIG. 30. In the table, "n"denotes any natural number. Here, only combinations where no moire occurs are listed. The delta arrangement is limited to an aspect ratio of 3:1 in view of the image quality at the flat image display time such as described in explanation for FIG. 3. The term "mosaic-delta" means a constitution including a delta arrangement and pixels with different colors adjacent to each other through one row interposed therebetween (constituting a mosaic arrangement as viewed with every other row), and all of the color arrangements shown in FIG. 1 to FIG. 6 correspond to this mosaic-delta. A simple delta arrangement which is not the mosaic-delta has a constitution that pixels adjacent to each other through one row interposed therebetween in vertical direction have the same color, as well known. In the table shown in FIG. 30, "◯" indicates excellent characteristics, "Δ"indicates insufficient characteristics, and "X" indicates poor characteristics. The number of parallax per row corresponds to Ps/Pp in case of the IP having sets of parallel beams and it corresponds to Pe/Pp in case of the multiview system. According to this comparison table, assuming that moire does not occur, the number of combinations where all of square pixel/square arrangement suitable for a fast image processing and color distributions influencing an image quality are excellent is limited.

In the examples referring to FIG. 1, FIG. 5 and FIG. 6, a beam controlling element 334 having an elemental image 43 or the parallax barrier pitch of 18n times the pixel pitch and an optical aperture extending in a vertical direction is provided and pixels with an aspect ratio of 3:1 are arranged in a delta shape where pixels 34 in rows adjacent to each other through a row interposed therebetween develop different colors (mosaic delta) and identical colors do not form a continuous straight line. With such a constitution, even in either of a stereoscopic display and a flat display, an aspect ratio of effective pixels becomes 1 and the effective pixels constitute a square arrangement, so that a fast image processing is made possible easily. The comparison table shown in FIG. 30 shows such a fact that this constitution is one of the most preferable constitutions.

Figure 33:
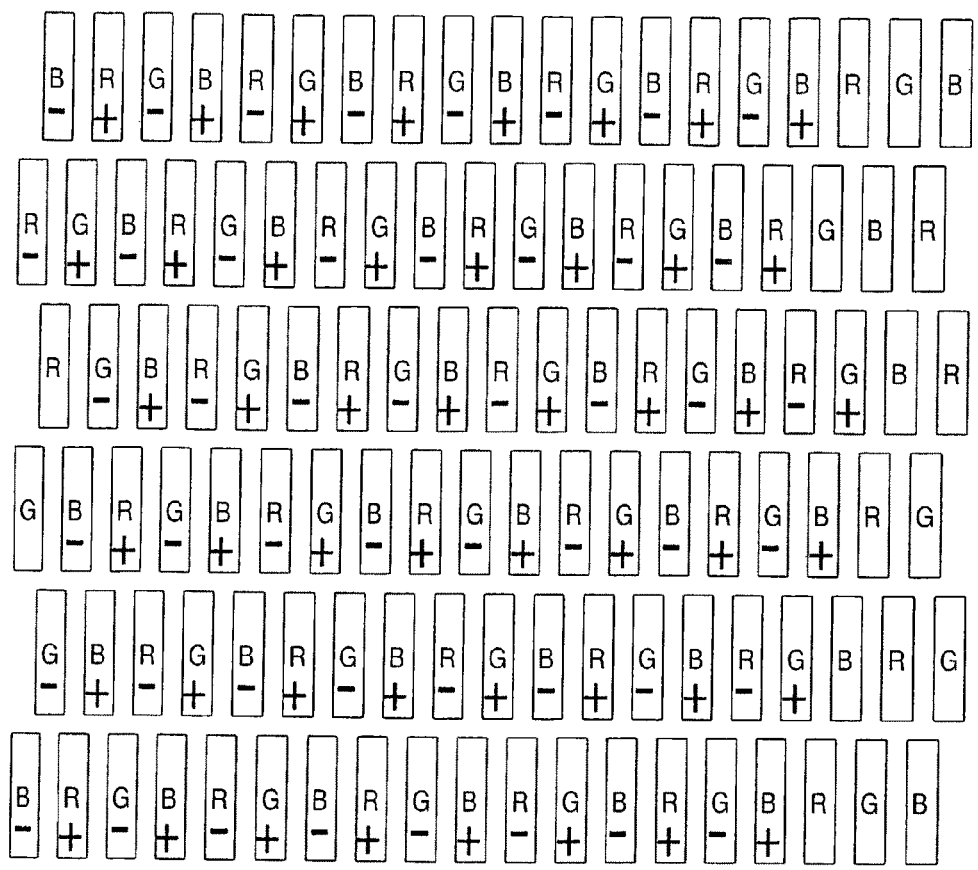
FIG. 33 is a diagram schematically showing signal polarities of respective pixels within the same field of a stereoscopic display device according to one embodiment of the present invention.
Figure 34:
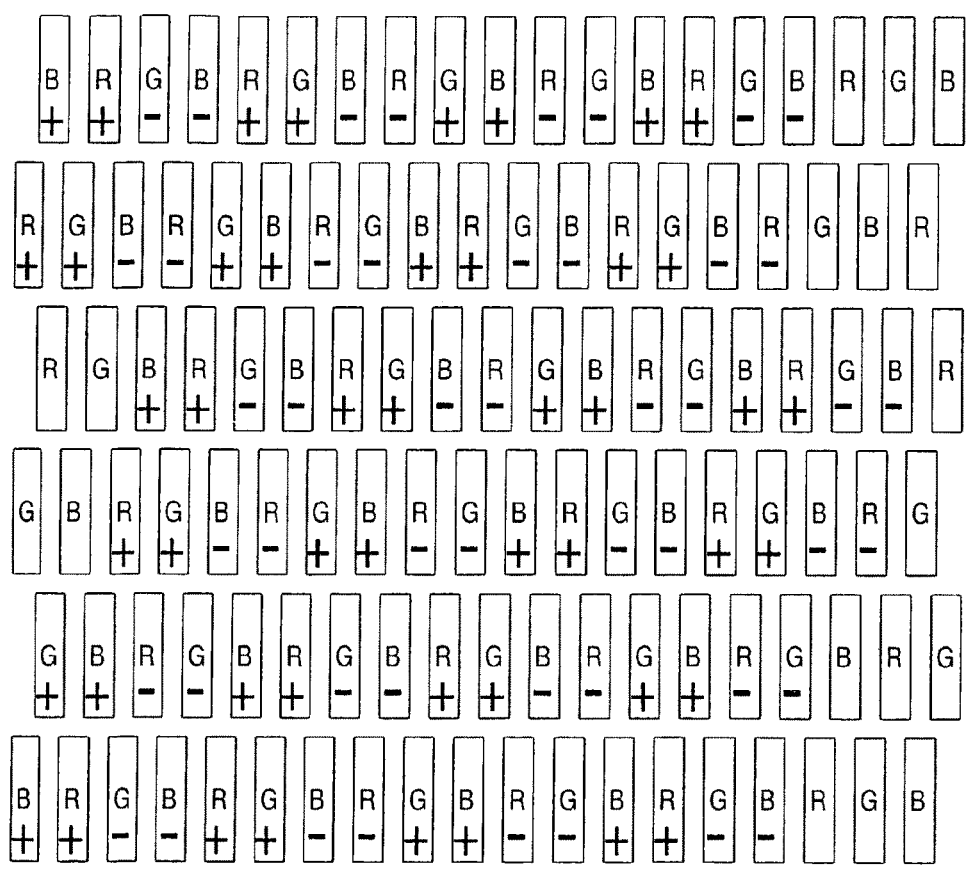
FIG. 34 is a diagram schematically showing signal polarities of respective pixels within the same field of a stereoscopic display device according to one embodiment of the present invention.
Figure 35:
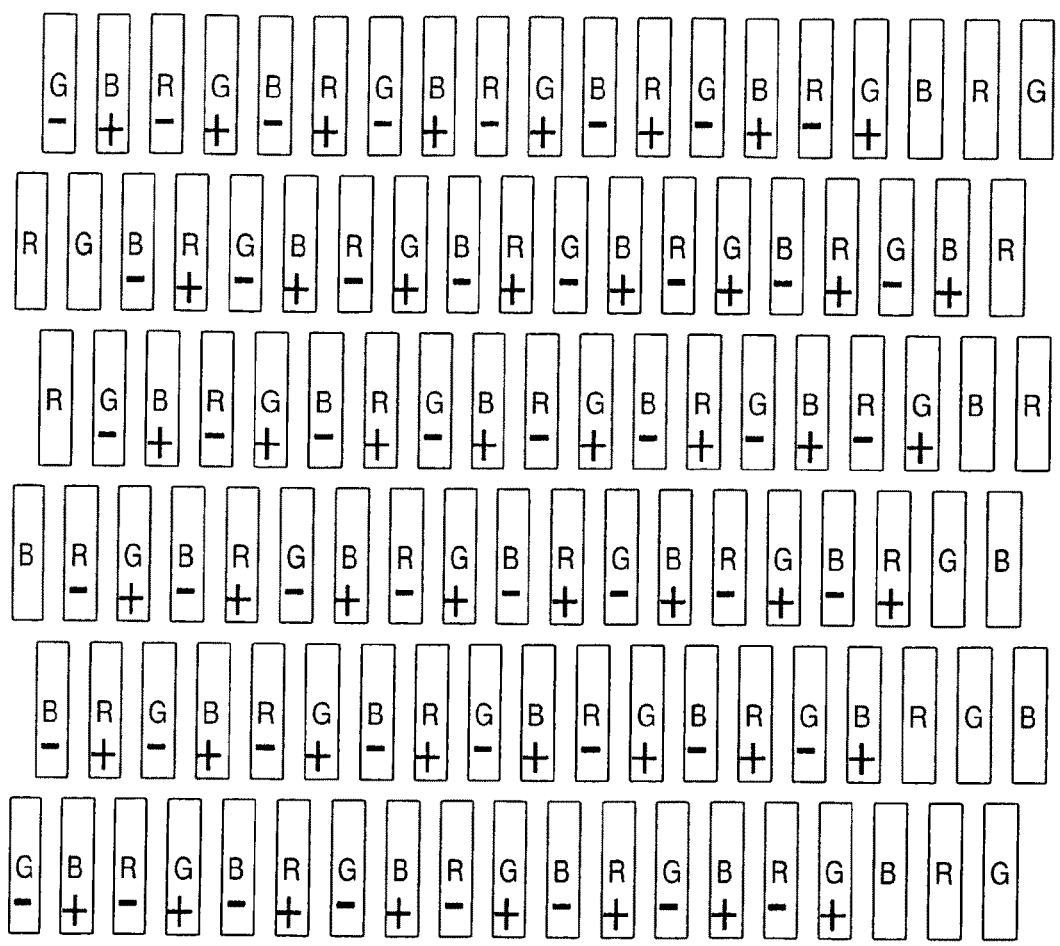
FIG. 35 is a diagram schematically showing signal polarities of respective pixels within the same field of a stereoscopic display device according to one embodiment of the present invention.

In order to suppress flicker or cross talk in a liquid crystal display device, a polarity reversing drive for each field is frequently performed. However, when a color arrangement is different from an ordinary one like this embodiment, particularly when displaying is performed with a single color at the flat display time where the beam controlling element is invalidated, color flicker may occur. At a stereoscopic display time, since a set of pixel rows which can be seen varies according to a position of a viewpoint, flicker occurs partially in some case, even if a simple signal line inversion drive (a V line inversion drive) or the like is conducted. In order to prevent occurrence of flicker, it is desirable that pixels with the same color closest to each other in adjacent rows are driven in the same field by image signals with different polarities, or pixels closest to each other in the same column are driven in the same field by image signals with different polarities, and it is further desirable that both the operations are performed. That is, such a disposition that an oblique direction along which colors are arranged and another oblique direction along which the same polarities are arranged are crossed is suitable. As examples showing an arrangement of signal polarities in the same field, there are such patterns as shown in FIG. 33 to FIG. 35.

Next, stereoscopic displays performed by parallax image arrangements of the multiview system and the IP system will be explained with reference to FIG. 8A to FIG. 17. Displays of stereoscopic images shown in FIG. 8A to FIG. 16 are realized by the display devices explained with reference to FIG. 1 to FIG. 7.

In not only the IP system but also the multiview system, since the viewing distance is generally finite, a display image is produced such that a perspective projection image at the viewing distance can be seen actually. Image processing (rendering process in a computer graphics) is performed for each crossing point of a line connecting a pixel and a slit and a horizontal line on a viewing distance plane (a position corresponding to a viewpoint height) so that a perspective projection image is produced. Here, the perspective projection image may be produced for each of a pair of a crossing point (viewpoint) of a pixel column substituted for the pixel and the pixel.

Figure 8A:
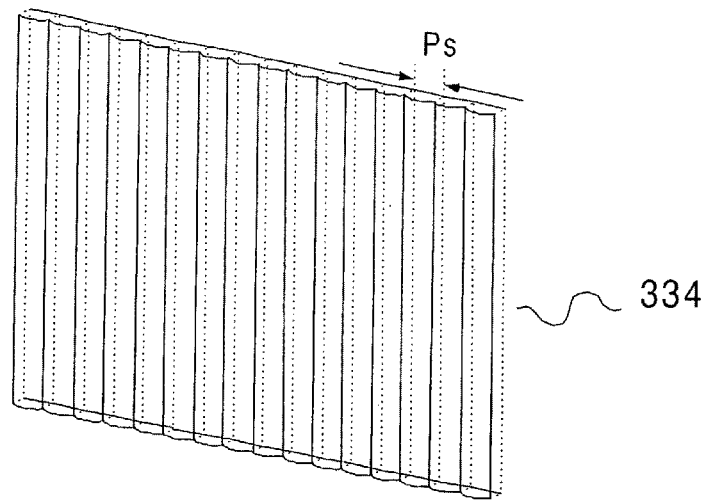
FIG. 8A is a perspective view of a case that a beam controlling element is a lenticular sheet in the first embodiment.
Figure 8B:
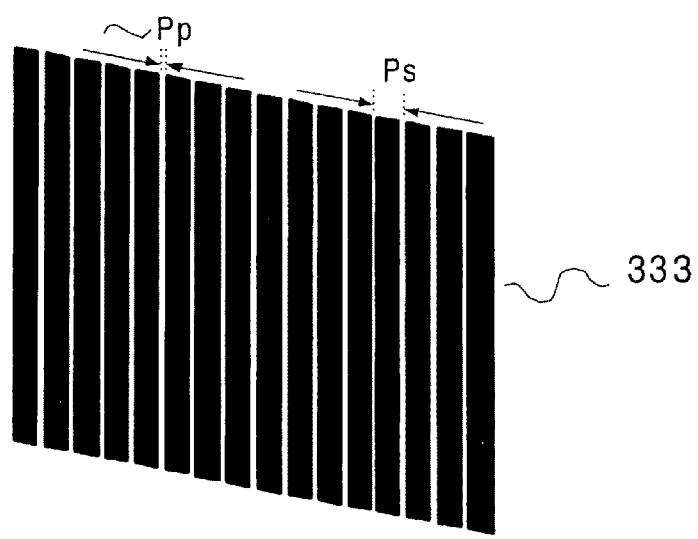
FIG. 8B is a perspective view of a case that the beam controlling element is a slit in the first embodiment.

FIG. 8A is a perspective view of a lenticular sheet 334 serving as a beam controlling element or a parallax barrier, and FIG. 8B is a perspective view of a slit 333 serving as a beam controlling element or a parallax barrier.

Figure 9:
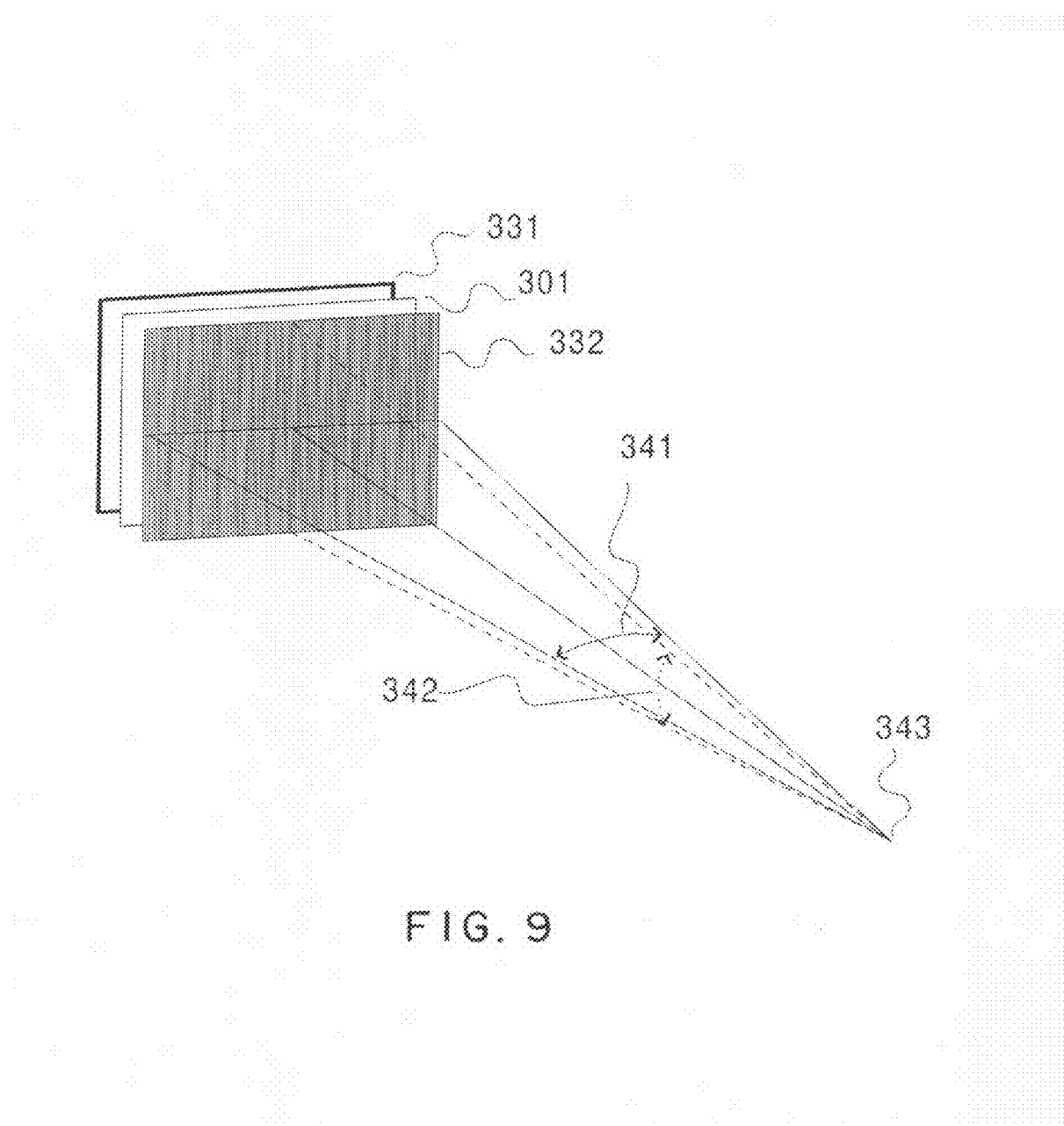
FIG. 9 is a perspective view schematically showing the stereoscopic display device according to the first embodiment of the present invention.
Figure 10:
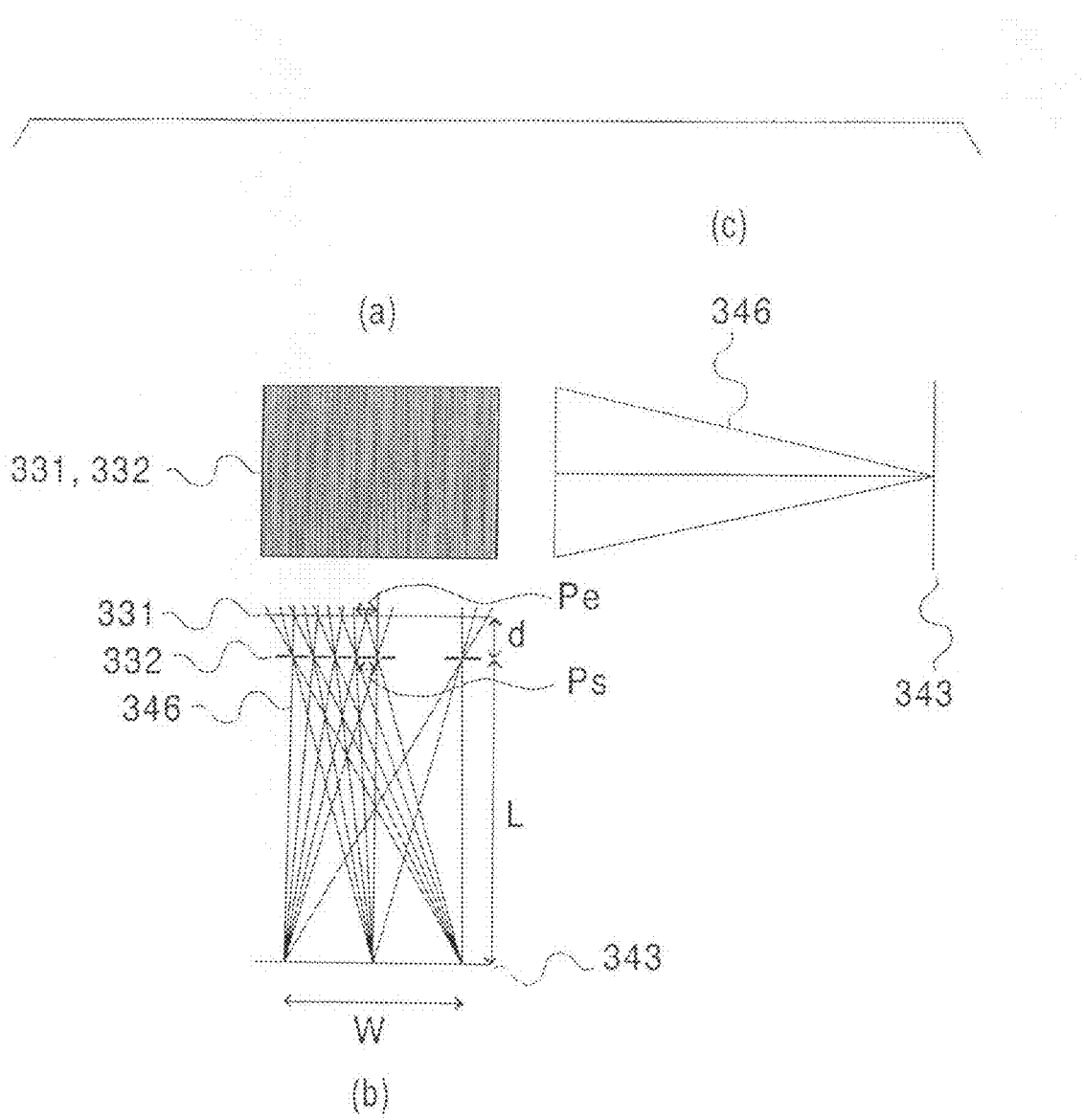
FIG. 10(a) is a front view of a liquid crystal panel and a parallax barrier according the first embodiment.
FIG. 10(b) is a plan view showing an image arrangement of the stereoscopic display device according to the first embodiment.
FIG. 10(c) is a side view showing the image arrangement of the stereoscopic display device according to the first embodiment.

FIG. 9 is a perspective view schematically showing the whole of a stereoscopic display device. In a stereoscopic display device shown in FIG. 9, a diffusion sheet 301 is provided between an independent parallax barrier 332 and a flat image display portion 331, but it is not required necessarily. When the flat image display portion 331 is constituted of a liquid crystal display device, a diffusion layer on a surface of a polarizing plate may be substituted for the diffusion sheet, and when a lenticular sheet is used in place of the parallax barrier 332, a back face thereof may has a diffusion property.

FIGS. 10(a), 10(b) and 10(c) are developments schematically showing beam loci within a vertical plane and a horizontal plane on the basis of a display portion of the stereoscopic display device shown in FIG. 9, FIG. 10(a) being a front view of the flat image display portion 331 and the parallax barrier 332, FIG. 10(b) being a plan view showing an image arrangement of the stereoscopic display device and FIG. 10(c) being a side view showing the stereoscopic display device. As shown in FIG. 9 and FIGS. 10(a) to 10(c), the stereoscopic display device is provided with the flat image display portion 331 such as a liquid crystal display device and the parallax barrier 332 having optical apertures. The parallax barrier 332 is constituted of a lenticular sheet 334 of a shape where optical apertures extending in a straight line manner vertically are arranged periodically in a horizontal direction or slits 333, such as shown in FIGS. 8A and 8B. In the stereoscopic display device, a stereoscopic image can be observed at the front and the rear of the flat image display portion 331 by observing a display device 331 via the parallax barrier 332 from the position of eyes. Here, the number of pixels on the flat image display portion 331 is 1920 in the lateral direction (the horizontal direction) and 1200 the longitudinal direction (the vertical direction), when the number is counted on the basis of a pixel group constituting the minimum unit for a square, and a pixel group of each minimum unit includes pixels of red (R), green (G) and blue (B).

Figure 11:
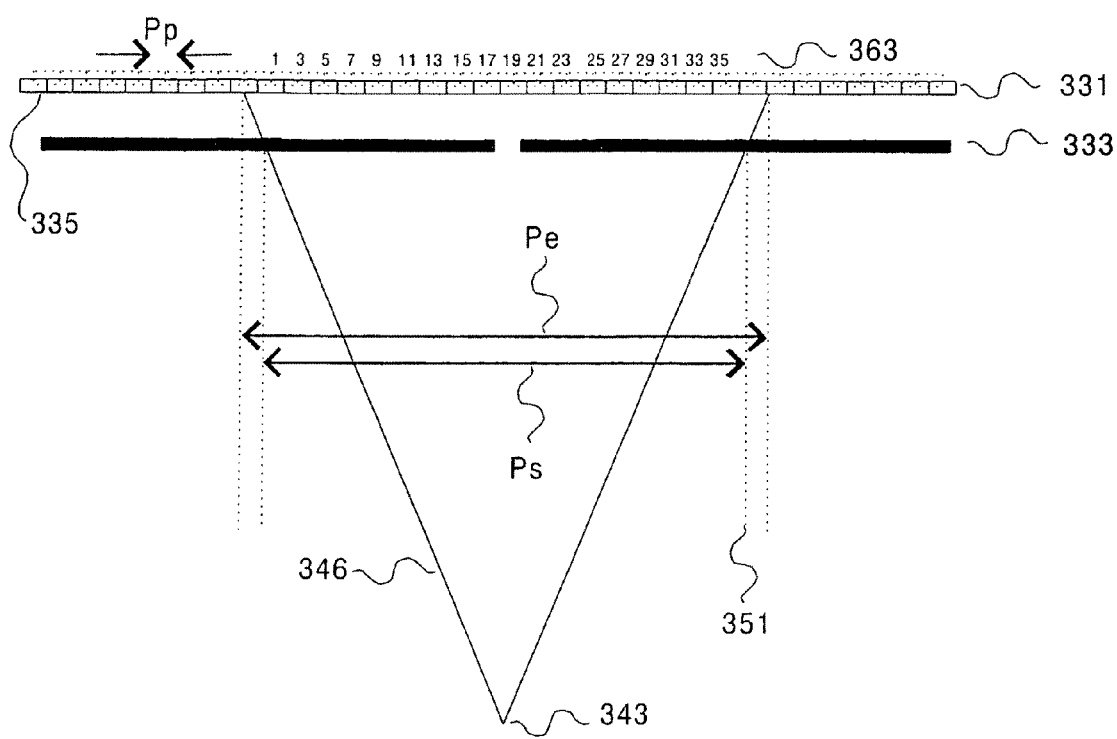
FIG. 11 is an illustrative diagram showing a positional relationship among pixels in an integral photography system, an elemental image and a parallax barrier.
Figure 12:
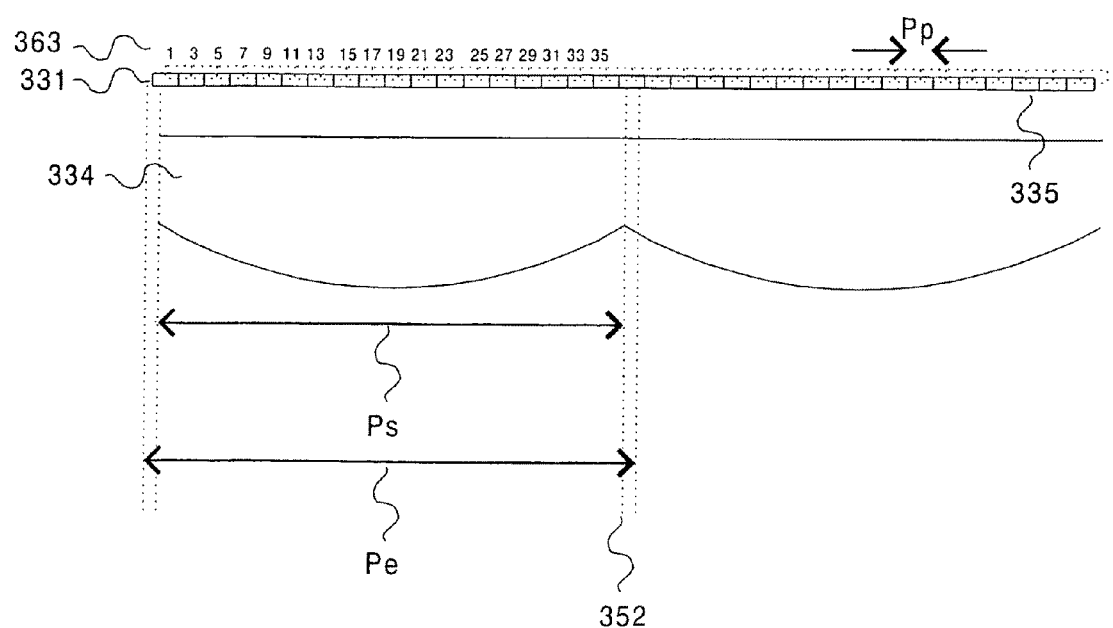
FIG. 12 is an illustrative diagram showing a positional relationship among pixels in an integral photography system, an elemental image and a parallax barrier according to the first embodiment of the present invention.

FIG. 11 or FIG. 12 is a diagram schematically showing a horizontal section of a display portion of the stereoscopic display device. A pitch Ps (period) of a slit 333 or the lenticular sheet 334 in a horizontal direction as shown here is set to a size of an integer number of pixels correctly. That is, a center axis 351 (refer to FIG. 11) passing through the center between respective slits 333 or a reference axis 353 (refer to FIG. 12) passing through a boundary between adjacent lenticular lenses of the lenticualr sheet 334 passes through an middle between the center of a pixel on an odd row (a pixel shown with solid lines in the figure) and the center of a pixel on an even row (a pixel shown with broken lines in the figure). An integer number of pixels are arranged in region corresponding to a space between the center axes 351 or the reference axes 352, and a pitch Ps (period) of the center axes 351 or the reference axes 352 in a horizontal direction is set to a constant value.

Figure 13:
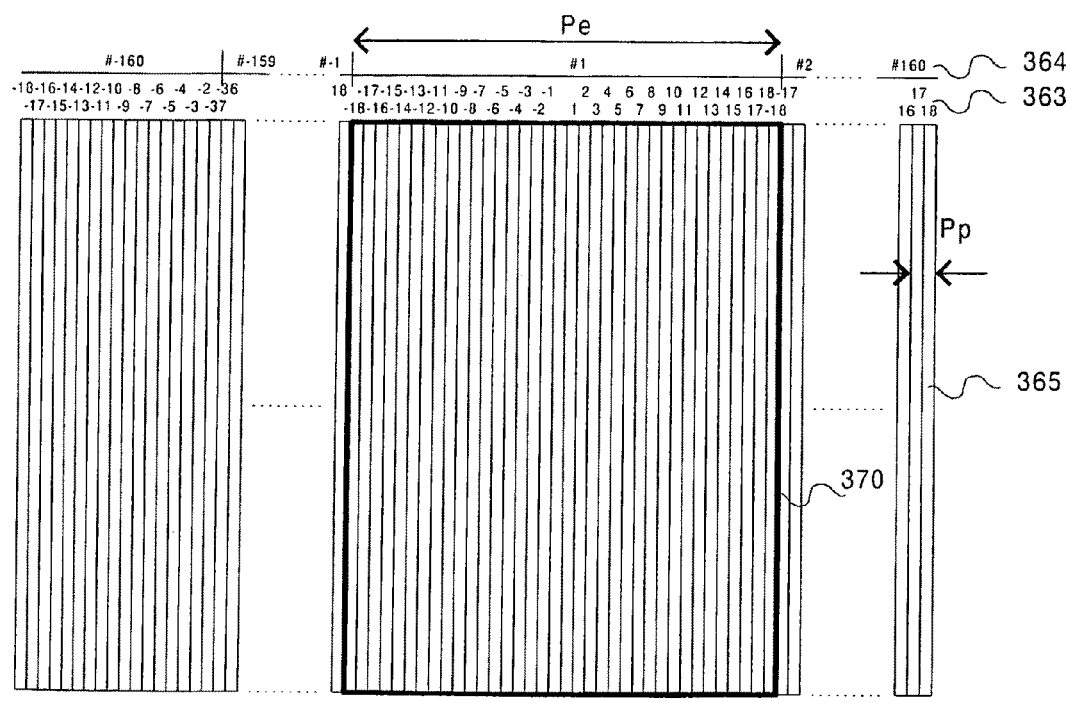
FIG. 13 is an illustrative diagram showing an image arranging method of a stereoscopic display device of an integral photography system according to the first embodiment of the present invention.
Figure 14:
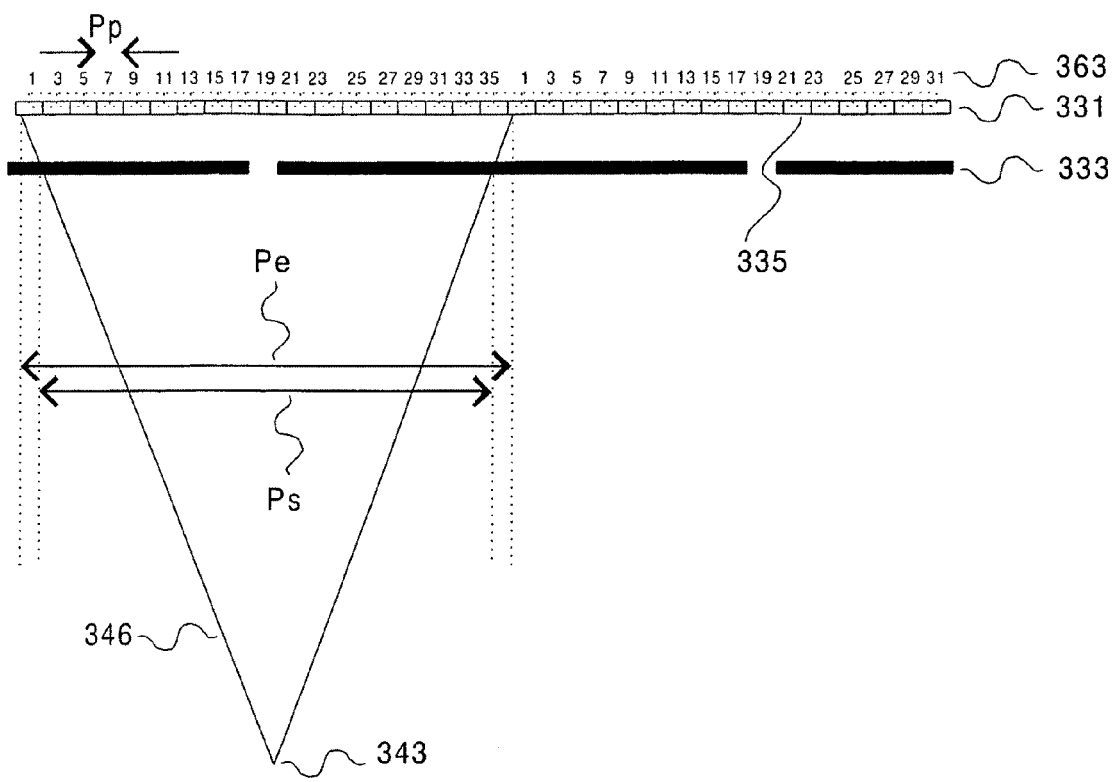
FIG. 14 is an illustrative diagram showing a positional relationship among pixels, an elemental image and a parallax barrier of a multiview system.

FIG. 13 is a diagram schematically showing a front of the display portion of the stereoscopic device. In an example shown here, the pitch Ps in the horizontal direction is set to a size of 18 pixels. A gap d (refer to FIG. 10(b)) between the flat image display portion 331 and the parallax barrier 332 of the display device is effectively set to about 2 mm considering the refractive index of glass substrate or lens material. Thus, such a constitution that the pitch Ps of the parallax barrier 332 (not the pitch Ps which can be seen due to a difference in distance but an actual pitch Ps of the parallax barrier) is integer times the pixel-to-pixel pitch Pp is generally not classified to the multiview system, but it is classified to the one-dimensional integral photography, as explained above, where such an advantage that a stereoscopic image producing efficiency is improved is obtained, because the set of parallel beams are produced. On the other hand, such a constitution that the elemental image pitch Pe is integer times the pixel-to-pixel pitch Pp like the horizontal section shown in FIG. 14 is generally classified to the multiview system.

In FIGS. 10(a), 10(b) and 10(c), when a viewing distance L between the parallax barrier 332 and the a viewing distance plane 343, the parallax barrier pitch Ps, and the parallax barrier gap d are defined, the pitch Pe of the elemental image is determined on the basis of a distance or interval obtained when an aperture center is projected on a display element from a viewpoint on the viewing distance plane 343. Reference numeral 346 denotes a line connecting the viewpoint position and each aperture center, and a viewing region width W is determined from such a condition that elemental images do not overlap with each other on the display plane of the display device.

In the one-dimensional IP system, it should be noted that the straight line 346 does not pass through the center of each pixel on the display plane of the display device necessarily. On the other hand, in the multiview system, a line connecting the viewpoint position and each aperture center passes through a pixel center to coincide with a beam locus. When the horizontal pitch Ps of the aperture is integer times the pixel pitch Pp, the pitch Pe of the elemental image includes a fraction slightly shifted on the large side from the integer times of the pixel pitch Pp. Even when the horizontal pitch Ps of the aperture is not the integer times the pixel pitch Pp, eventually, the pitch Pe of the elemental image generally includes a fraction shifted from the integer times the pixel pitch Pp in the one-dimensional IP system. On the other hand, the pitch Pe of the elemental image becomes integer times the pixel pitch Pp in the multiview system.

Figure 15:
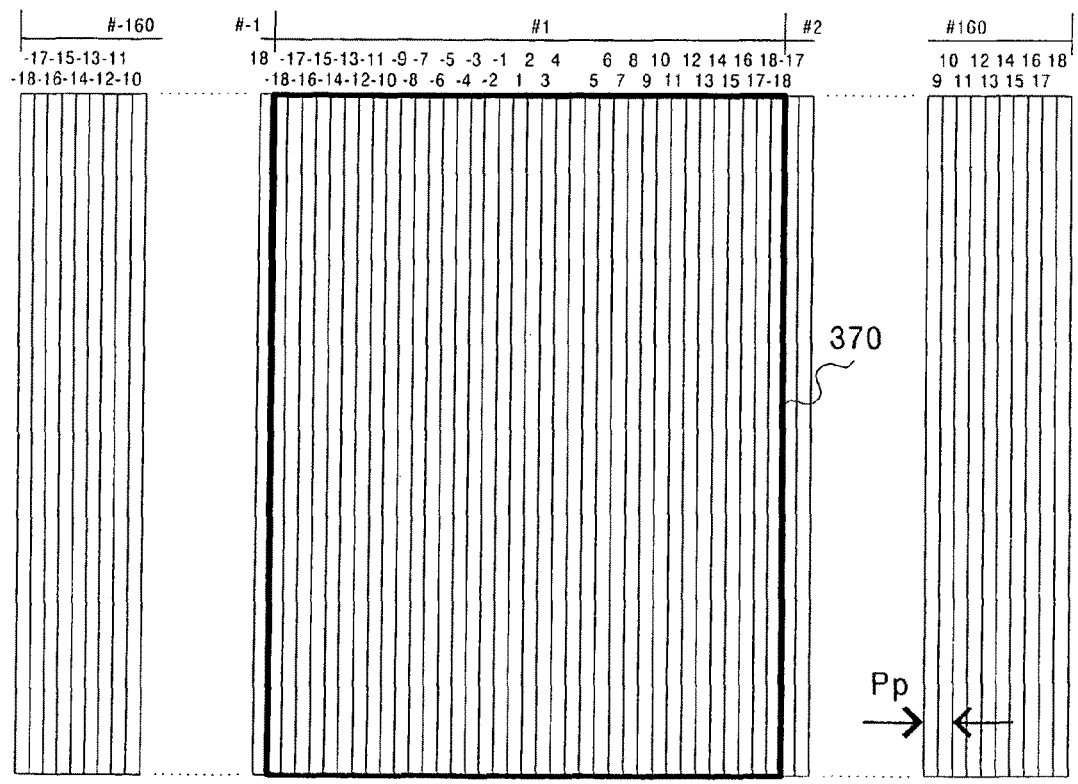
FIG. 15 is an illustrative diagram showing an image arranging method of a stereoscopic display device of the multiview system according to the first embodiment of the present invention.

FIG. 13 and FIG. 15 are conceptual diagrams of arrangement methods of images on display planes of the display devices in the IP system and the multiview system, obtained when a display portion of a stereoscopic display device has been viewed from the front thereof. The display plane of the display device is divided to elemental images 370 corresponding to respective apertures (opening portions of a parallax barrier), and each elemental image 370 is constituted of pixel columns (columns constituted of a set of pixels in two adjacent rows because of the delta arrangement) comprising 36 columns or 37 columns in the IP system (the elemental image width is originally a fraction slightly larger than 18 times the pixel width or pixel pitch Pp, but it corresponds to 36 columns or 37 columns according to a position for digital allocation). The total number of pixel rows which can be allocated with a parallax is 11520, because each pixel comprises three sub-pixels and a positional shift occurs between two rows, the number of apertures is 320 (in FIG. 13 and FIG. 15, the range of aperture numbers described in a region shown by reference numeral 364 is a range indicated by #–160 to #–1, and #1 to #160), and the aperture pitch Ps is equal to a size of the 18-pixels width.

In FIG. 13 and FIG. 15, in each pixel column 365, corresponding parallax numbers (in this example, corresponding to 74 directions of parallax numbers –37 to –1 and 1 to 37) are shown as items in a region indicated by a reference numeral 363. An elemental image indicated by aperture number #1 comprises columns of 36 parallaxes of parallax numbers –18 to –1 and 1 to 18, and an elemental image indicated by aperture number #–159 comprises columns of 36 parallaxes of parallax numbers –37 to –2. Since the width of the elemental image is slightly larger than the width of the 18-pixels column, when the boundary of the elemental image is caused to match with the closest pixel row boundary (a normal A-D conversion), the number of pixel columns in the aperture is 36 in most apertures, but apertures corresponding to 37 columns occur. The parallax number range in the aperture is shifted one by one from the aperture number corresponding to 37 columns. The aperture numbers corresponding to 37 columns are #5, #13, #21, #30, #38, #46, #55, #63, #71, #80, #96, #105, #113, #121, #130, #138, #146, and #155 (and their minus numbers) (in case of the viewing distance of 700 mm).

In FIG. 17, aperture numbers (Slit Number in Table) indicating start and end of arrangement of parallax images in each direction are shown. In this Table, pixel row numbers at corresponding 3-D display time, column numbers and pixel column numbers of the flat display device, and even and odd (odd row: 0 and even row: 1) of the row are also shown.

Incidentally, unlike the IP system, in the multiview system, the elemental image widths all comprise a width of 18 pixel columns, as shown in FIG. 15, and parallax numbers of –18 to –1 and 1 to 18 are similarly arranged in all of the elemental images.

FIG. 16 is a diagram showing a composing method of a parallax image and a stereoscopic image in a one-dimensional IP system under the condition that a set of parallel beams are provided. An object (subject) to be displayed 421 is projected on a projection plane 422 at the same position as a plane on which a beam controlling element of a stereoscopic display device is actually placed. At this time, projection is performed along projection lines 425 toward a projection-center line 423 which is parallel to the projection plane and is positioned at the front (a central portion in a vertical direction) and within a viewing distance plane so as to attain vertical perspective projection/horizontal orthographic projection. The projection lines do not cross in a horizontal direction but they cross on the projection-center line in a vertical direction. An image 424 of the subject which is subjected to vertical perspective projection/horizontal orthographic projection is formed on the projection plane by the projecting process. This process is performed in the same manner as a rasterizing operation or a rendering operation of a commercially available computer graphics producing software except that projection processes in a vertical direction and in a horizontal direction are different from each other. An image (a parallax image) 426 corresponding to one direction, which has been subjected to vertical perspective projection/horizontal orthographic projection on the projection plane, is divided to respective one columns of pixels along a vertical direction, and these columns are arranged on a display plane 427 of the display device in a dividing manner at intervals of an aperture pitch Ws (at intervals of a fixed number of pixel columns). Regarding the other projection directions 428, the same operation as the above is repeated to complete the whole of the display plane 427. In FIG. 16, only 8 directions of –4, –3, –2, –1, 1, 2, 3 and 4 are shown, but several tens directions will be required depending on the viewing distance, for example, the number of projection directions is 74 in the example shown in FIG. 17. Incidentally, only a column(s) in a required range may be produced for each projected image 426. The required range is shown in FIG. 17. Respective projecting directions correspond to the parallax numbers, but respective directions do not have an equal angle but they are set to have equal intervals on the viewing distance plane (the projection-center line). That is, this corresponds to an operation where photographing is performed while parallel movement (orientation is fixed) of a camera is being conducted at equal intervals on the projection-center line.

Figure 19:
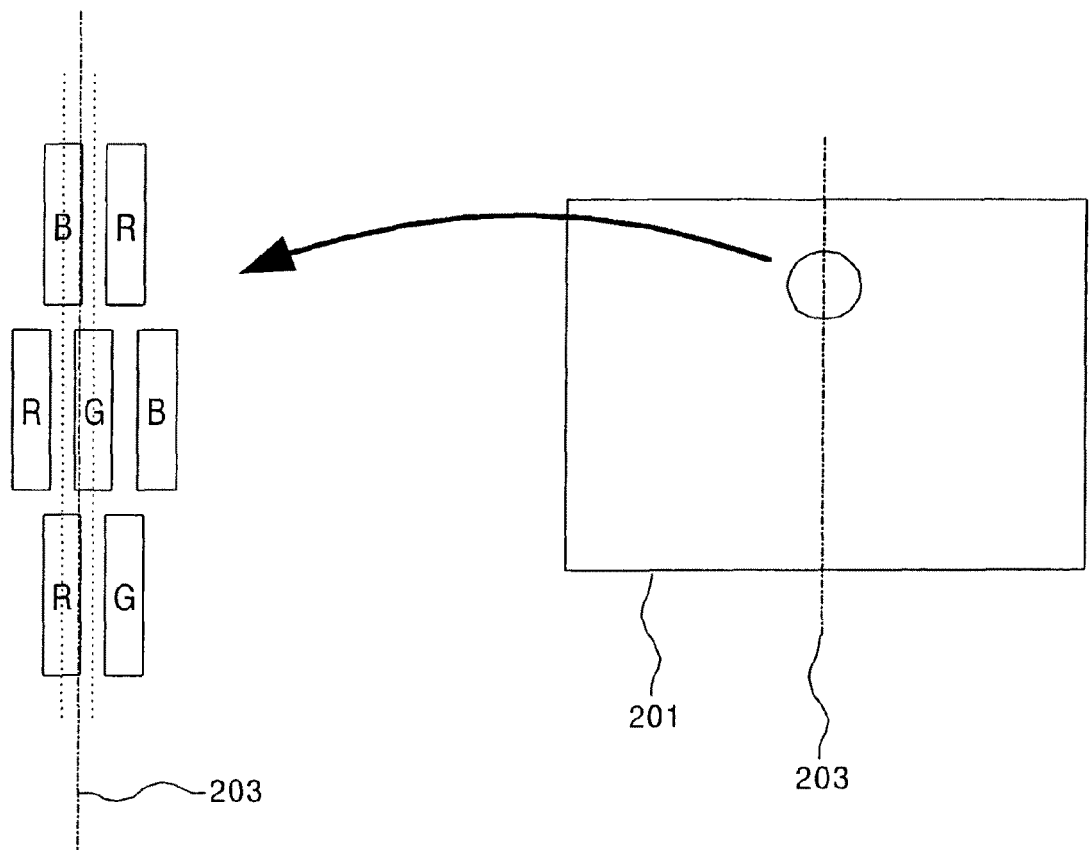
FIG. 19 is an illustrative diagram showing a positional relationship between pixels and an elemental image boundary in the first embodiment of the present invention.

A Table (delta/mosaic-delta, the number of parallax: 36) shown in FIG. 31A is a table that, when the elemental image pitch or the parallax barrier pitch is 18 times the pixel pitch and a liquid crystal panel having the number of pixels defined by a normal standard is used for the flat image display portion, excess rows or columns may occur. Particularly, when the number of pixels at a stereoscopic display time is caused to match with standard specification such as VGA, SVGA, XGA or ¼ thereof, excess may occur in both row and column. In order to allocate excess rows or columns to a periphery uniformly, it is preferable that the entire screen is first made symmetrical to make the number of elemental images even. It is preferable that an elemental image boundary at a central position of the whole screen is set such as shown in FIG. 19. That is, in the multiview system, it is desirable that the elemental image boundary is set at the middle between pixel centers of pixels in rows adjacent in a vertical direction and the elemental image boundary is set at a center position 203 of the flat image display portion 201 in a lateral direction. In the IP system, it is desirable that an elemental image boundary at the center position 203 of the display plane in the lateral direction is set at the middle between pixel centers of pixels in rows adjacent in a vertical direction. The allocation table shown in FIG. 17 shows the results obtained by application of this method. When this method is not applied, not the elemental image boundary but an elemental image center is disposed at the central portion of the display plane and the number of excess columns becomes odd, which results in inconvenience that symmetrical allocation is made impossible. When allocation of pixels is made symmetrical, allocation of parallax is made symmetrical, so that an excellent result can also be obtained regarding a fast image processing.

Figure 32A:
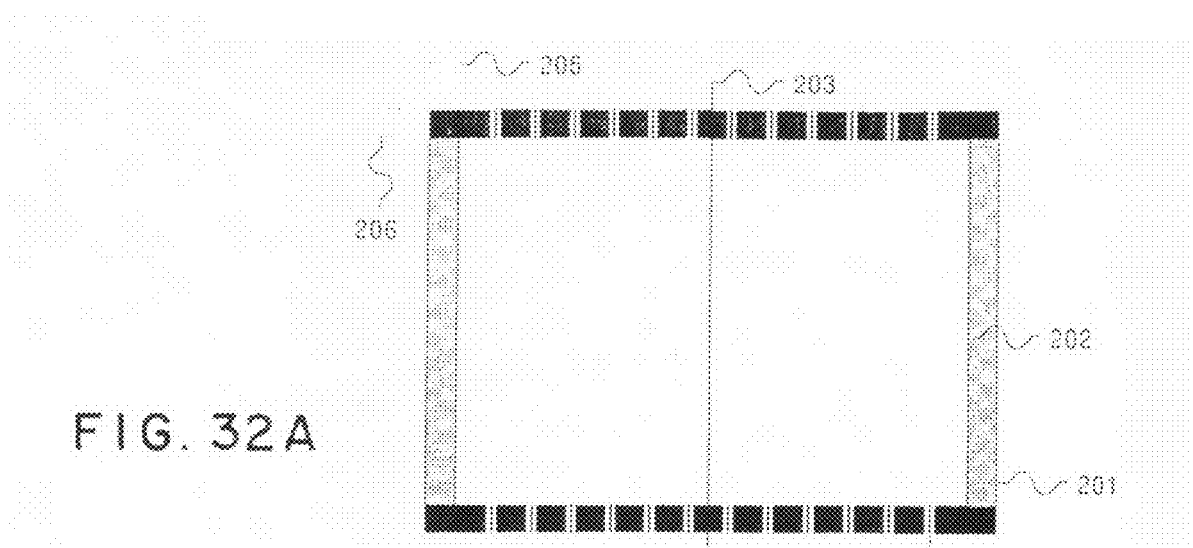
FIGS. 32A to 32C are diagrams schematically showing a display method on an excess row region and an excess column region of a stereoscopic display device according to one embodiment of the present invention.
Figure 32B:
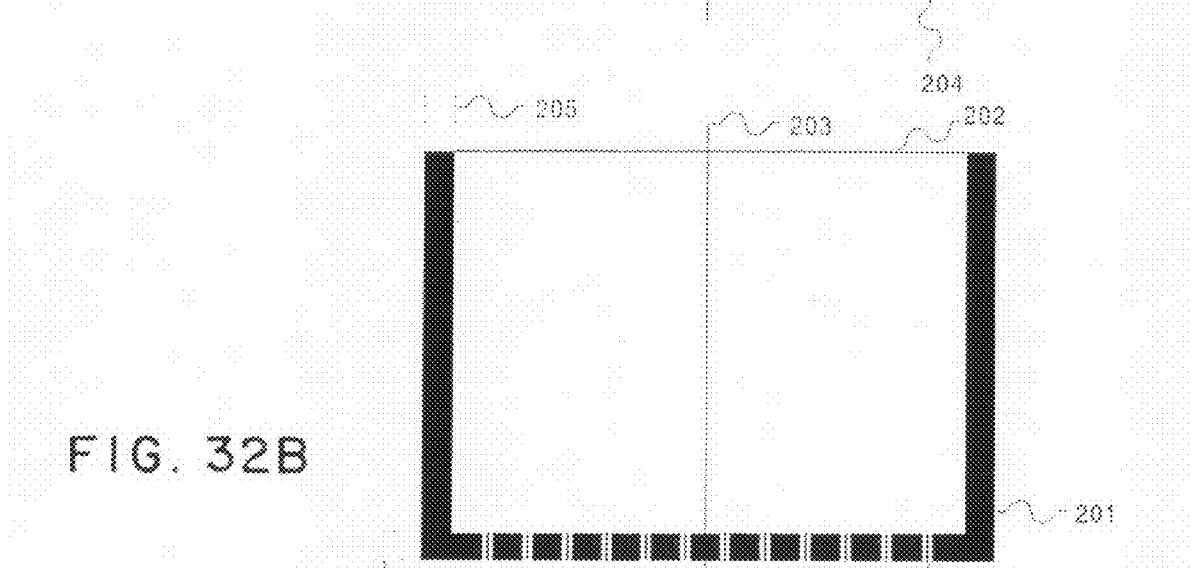
Figure 32C:
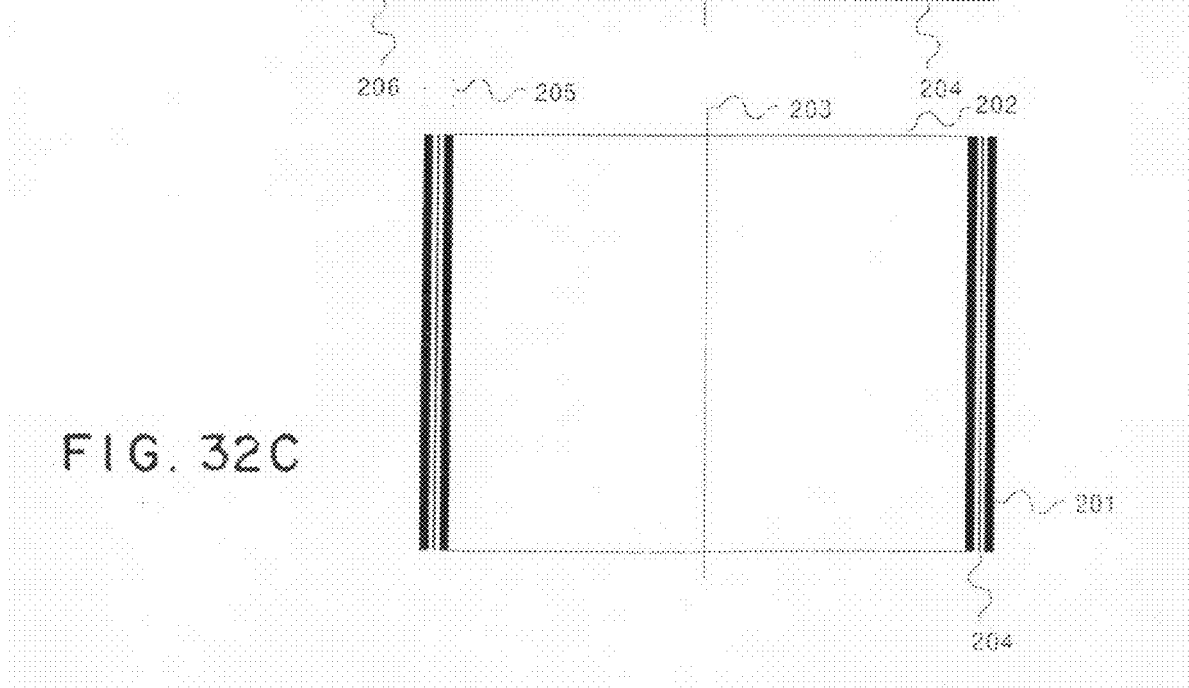

FIGS. 32A, 32B and 32C show three examples in total of an example where an excess pixel row portion 206 is uniformly arranged above and below the flat image display portion 201 or it is collectively arranged above or below the flat image display portion 201 and a pattern FIG. 204 serving as a guide for stereoscopic view is displayed on the excess portion (refer to FIGS. 32A and 32B), an example where an excess pixel row portion 205 is uniformly arranged symmetrically and a pattern FIG. 204 serving as a guide for stereoscopic view is displayed on the excess portion (refer to FIG. 32C) and an example where burr images are displayed on both end portion (refer to FIG. 32A). In FIGS. 32A, 32B and 32C, reference numeral 202 denotes a stereoscopic image display portion, and reference numeral 203 denotes the center line of a display plane of the flat image display portion 201. As the guide pattern, such a method can be employed that two lines are displayed on each opening portion of the beam controlling element such that, when an observer is present just at a central position of a viewing distance, an observer can see bright lines with his/her both eyes. Thereby, the observer himself/herself can confirm whether or not he/she is present at a proper observing position, which makes stereoscopic view easy. Regarding both left and right ends, by burring an edge between an image display portion and a non-display portion, it is made possible to reduce a factor for blocking a stereoscopic view such as a frame effect (frame canceling).

Second Embodiment

Figure 21:
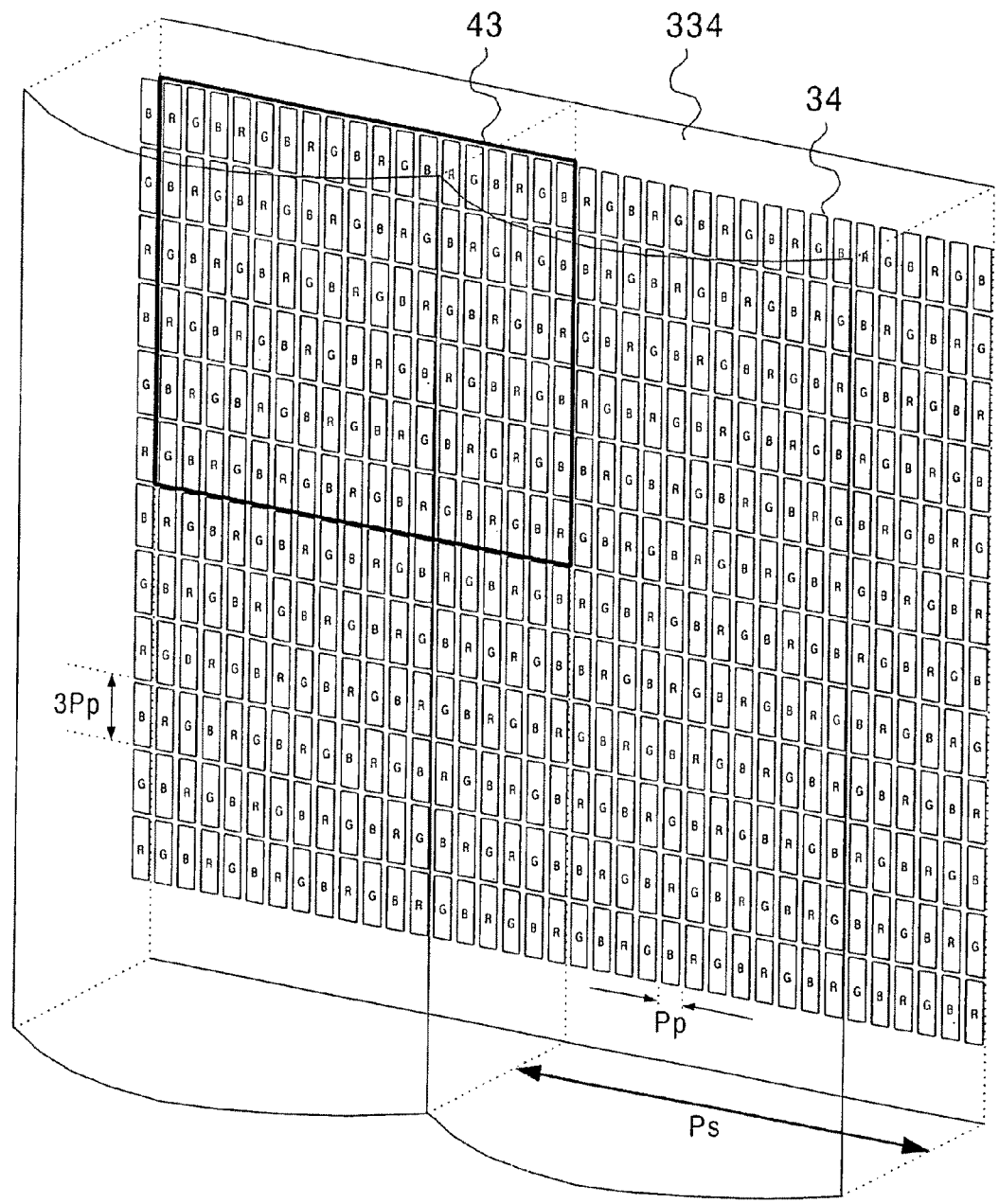
FIG. 21 is a perspective view schematically showing a pixel arrangement to which a pixel arrangement on a stereoscopic display device according to a second embodiment of the present invention is applied.

FIG. 21 is a perspective view schematically showing a constitution of a stereoscopic display device according to a second embodiment of the present invention.

Figure 22:
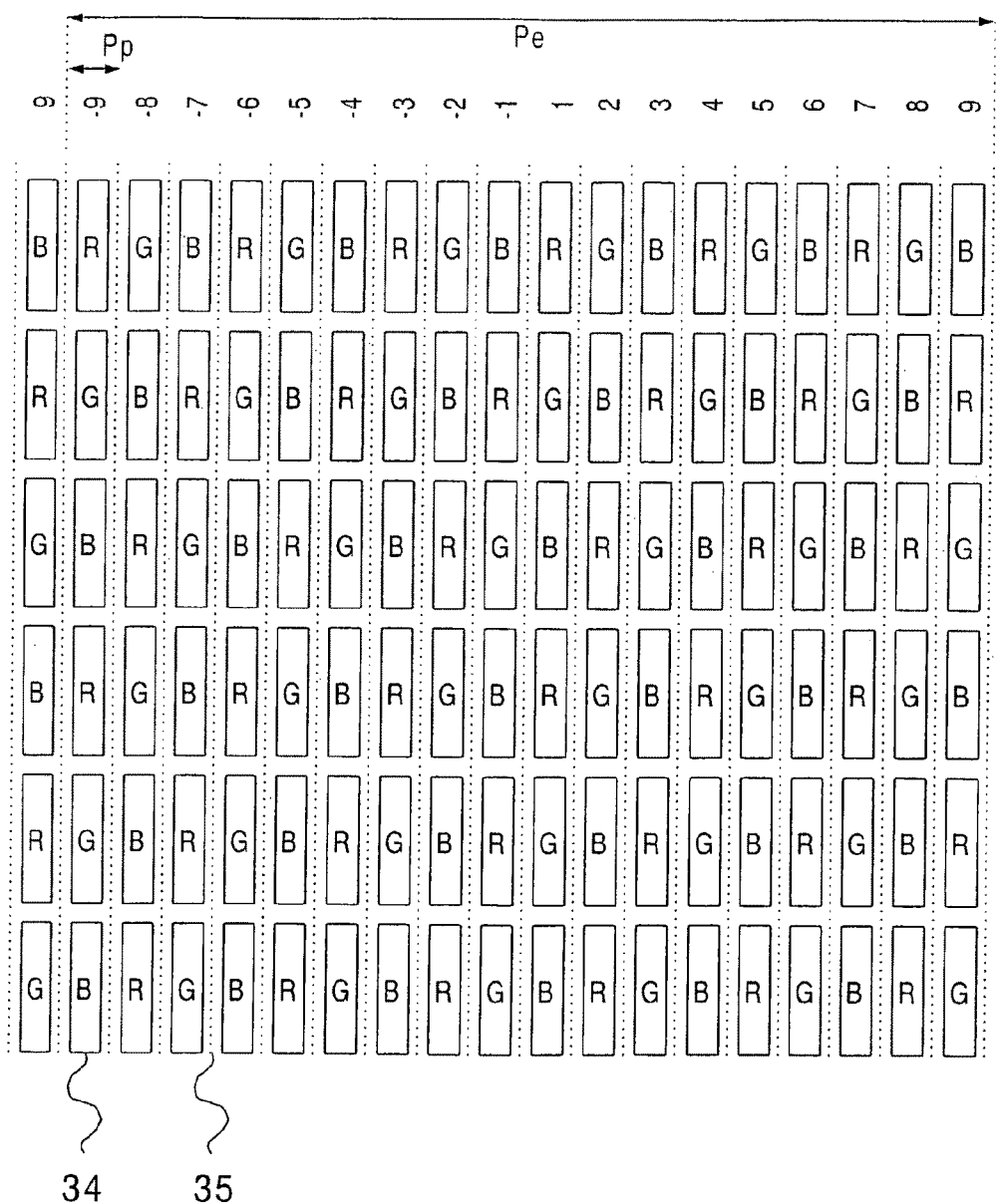
FIG. 22 is a plan view schematically showing a pixel arrangement to which a pixel arrangement on a display plane of the stereoscopic display device according to the second embodiment of the present invention is applied.

In such a stereoscopic display device as shown in FIG. 21, a lenticular sheet 334 comprising cylindrical lenses whose optical apertures extend vertically, which serves as a beam controlling element, is disposed at the front of a display plane of a flat parallax image display portion such as a liquid crystal panel. Since the optical openings are arranged in a straight line not stepwise but vertically, it is easy to arrange a pixel arrangement in a square arrangement at a stereoscopic display time. Pixels 34 with an aspect ratio of 3:1 are arranged laterally and vertically in a straight manner and in a matrix manner on the display plane, and respective pixels are arranged such that red, green and blue are alternately positioned laterally in the same row and column. This color arrangement is generally called "a mosaic arrangement". FIG. 22 is a plan view showing an example of a pixel arrangement. Numerals of −9 to 9 represent parallax numbers, and adjacent parallax numbers are allocated to adjacent columns. A vertical period of pixel rows is three times a lateral period Pp of pixels.

Each pixel has an opening portion or a light emitting portion at a fixed area ratio, and the opening portion is surrounded by black matrixes 35. Since the pixel opening portions and the black matrixes 35 form a period in a horizontal direction in this manner and a lenticular sheet with a horizontal period of integer times the period is superimposed on the pixels, moire or color moire occurs on the display screen as a whole. In order to reduce the moire, the haze of a diffusion layer on a surface of a polarizing plate is set in a range of 20 to 70, so that an image of pixels is burred in such an extent that neighboring pixels are not mixed with each other. The diffusion layer is provided on a surface of the polarizing plate of an ordinary liquid crystal display device for preventing mirror reflection, but a diffusion layer with a haze slightly stronger than that of the diffusion layer for preventing mirror reflection is suitable for moire cancellation. When the haze is smaller than 20, a sufficient moire reducing effect cannot be achieved and when the haze is larger than 70, neighboring pixels are mixed so that burring appearance occurs in display. Therefore, the haze is required to be in a range of 20 or more and 70 or less, and it is preferable that the haze is about 35. In order to achieve the object of the present invention, since diffusion in a lateral direction is required to be moderate but it is preferable that there is no diffusion in a vertical direction. Therefore, there may be anisotropy in diffusion characteristic or haze between the vertical direction and the lateral direction. The diffusion layer may be integrated with a polarizing plate surface of the liquid crystal display device, it may be integrated with a back face of the lenticular sheet, or it may be an independent diffusion sheet.

On the display plane shown in FIG. 21, one effective pixel 43 (the one effective pixel 43 is indicated by a black frame in FIG. 21) is constituted of pixels 34 comprising 18 columns and 6 rows. In a structure of such a display portion, a stereoscopic display applying 18 parallaxes in a horizontal direction is made possible. Incidentally, when a parallax is applied in a vertical direction too, a boundary of the effective pixel 43 in a horizontal direction is regarded as an elemental image boundary in a vertical direction to allocate two parallaxes is allocated in a vertical direction so that the total of 36 parallaxes can be applied by multiplying the two parallaxes in the vertical direction by the 18 parallaxes in the horizontal direction.

FIG. 21 shows a portion near the central portion of the whole display plane, where the beam controlling element is approximately positioned at the front of the elemental image (the effective pixel).

In this display structure, the multiview system has 18 views, the elemental image pitch is 18-pixels pitch, and the lateral pitch of the beam controlling element becomes smaller than the 18-pixels pitch.

In the IP system, for example, in such a design that the 18-pixels pitch is equal to the parallax barrier pitch Ps, and a set of parallel beams can be formed, an elemental image boundary occurs at intervals (for example, 18.02) slightly larger than the 18-pixels width, so that the width of the effective pixel corresponds to 18 columns or 19 columns depending on its position within the display plane. That is, an average value of the elemental image pitches is larger than the 18-pixels width and the lateral pitch of the beam controlling element has 18-pixels width. Since the effective pixel 43 has an aspect ratio of 1 and is constituted in a square arrangement, displaying can be made with an effective resolution in a vertical direction substantially equal to an effective resolution in a horizontal direction. Accordingly, production of a display image is made easy, and display data or information applied to each image can be obtained relatively fast. Like the first embodiment, the resolution in the vertical direction is not required to match with the horizontal resolution necessarily.

Figure 29:
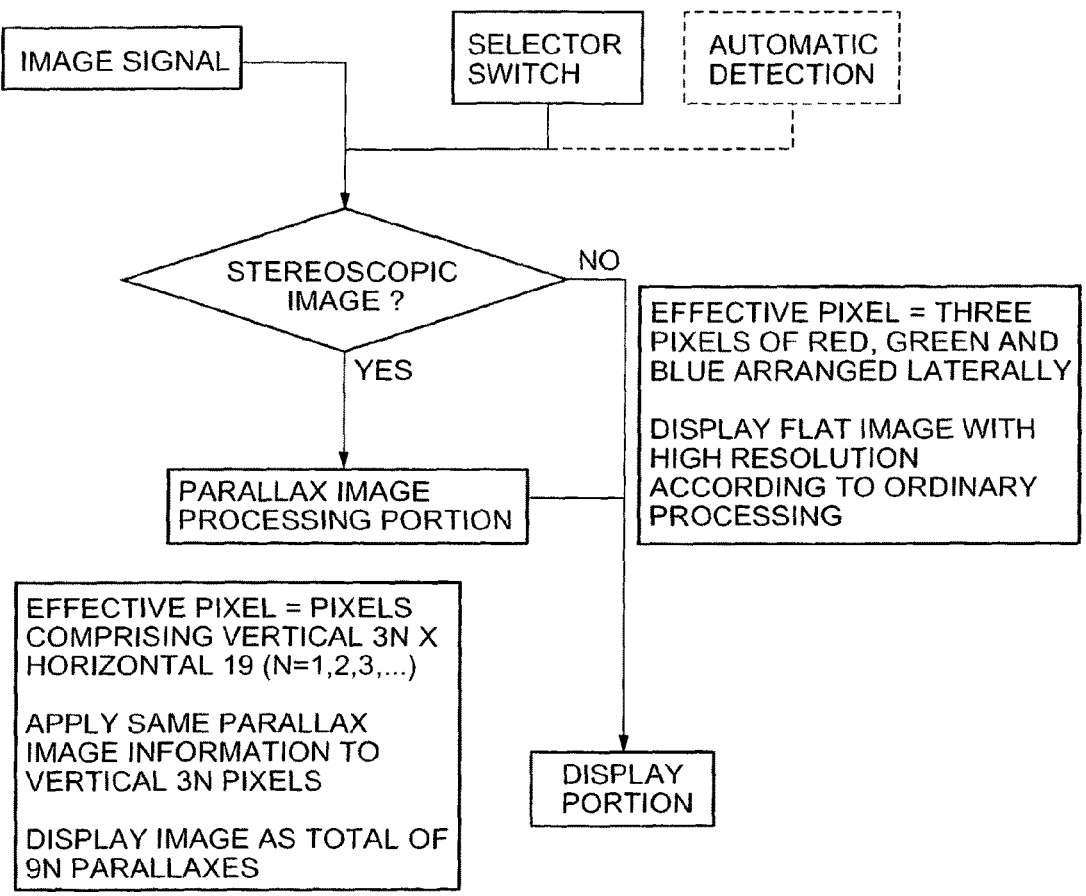
FIG. 29 is a flowchart showing a switching processing between a stereoscopic display and a flat display in the second embodiment of the present invention.

FIG. 29 is a flowchart showing a switching process between a stereoscopic display mode and a flat display mode. At a stereoscopic image display time, equal parallax image data or information is applied to 6 pixels arranged in a vertical direction in a straight line similar to a direction in which the opening portion of the beam controlling element extends and at the same position in a lateral direction by an effective pixel with a generally square shape comprising pixels of 6×18 extending vertically and horizontally within the range of the effective pixel 43, so that the total of 18 parallaxes and displaying is performed. At a flat image display time where the beam controlling element is detached or its function is invalidated, image signals is applied to perform displaying by an effective pixel with a square shape comprising 3 pixels of red, green and blue arranged horizontally. Thus, it is made possible to change the resolution according to a display aspect.

Figure 20:
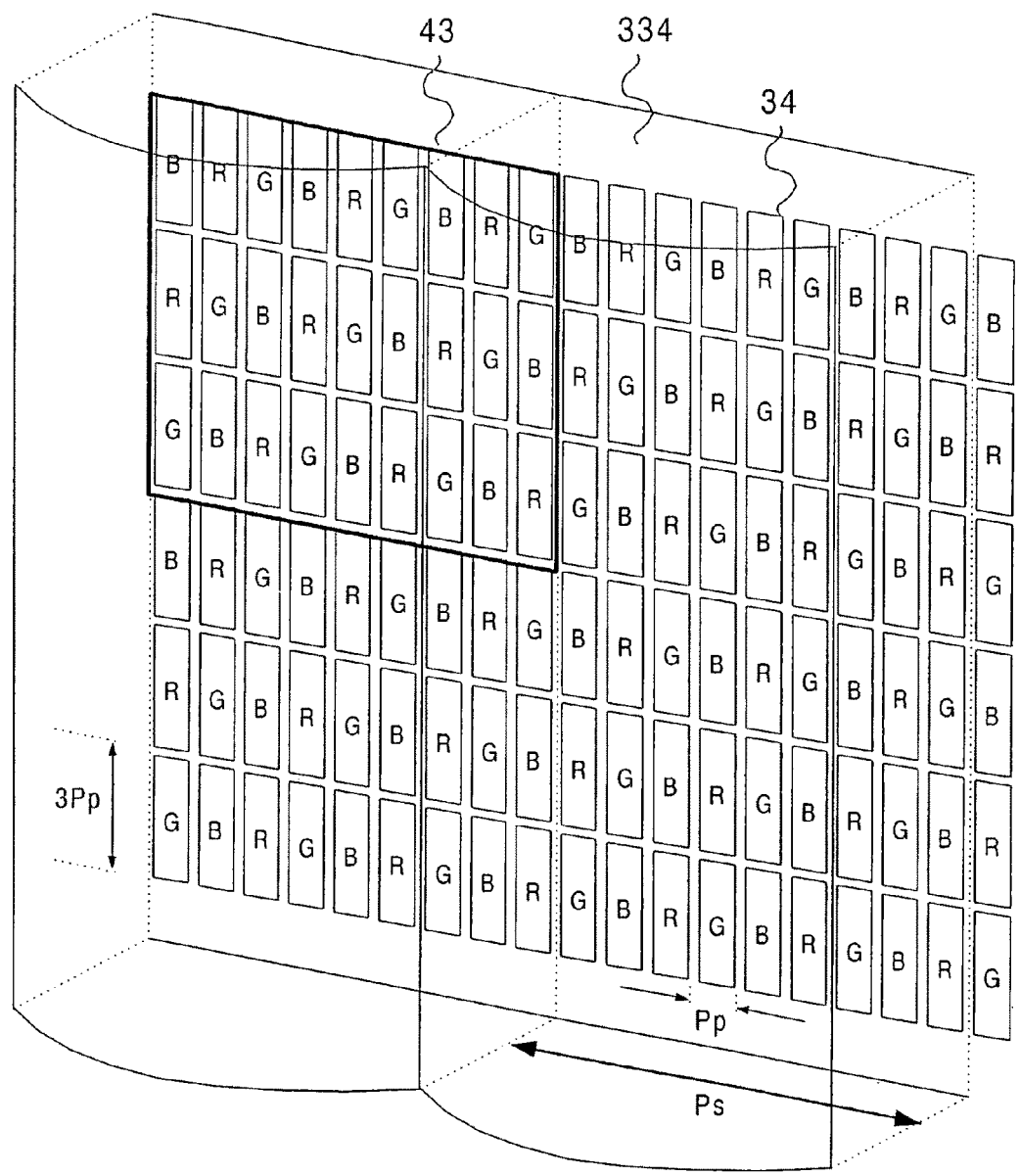
FIG. 20 is a perspective view schematically showing a pixel arrangement to which a pixel arrangement on the stereoscopic display device according to the first embodiment of the present invention is applied.

In an example of a display plane shown in FIG. 20, one effective pixel 43 (the one effective pixel 43 is indicated by a black frame in FIG. 20) is constituted of pixels 34 comprising 9 columns and 3 rows. In a structure of such a display portion, a stereoscopic display applying 9 parallaxes in a horizontal direction is made possible.

In the comparison table shown in FIG. 30, when a pixel arrangement is not a delta arrangement, as shown in FIGS. 20 and 21, a combination of the elemental image or the parallax barrier pitch of 9n times the pixel pitch, the beam controlling element having optical openings extending in a vertical direction, and pixels with an aspect ratio of 3:1 formed in a mosaic arrangement is one of the most desirable constitutions is shown.

Figure 36:
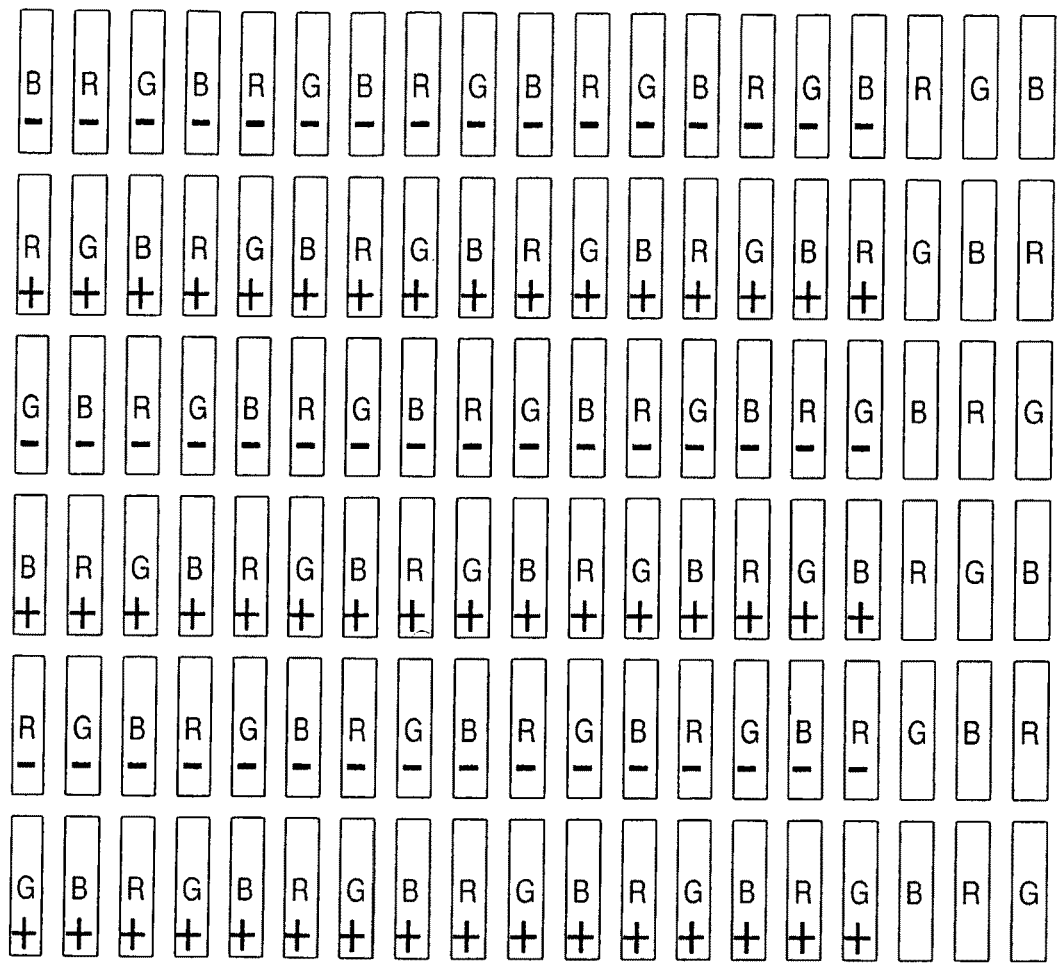
FIG. 36 is a diagram schematically showing signal polarities of respective pixels within the same field of a stereoscopic display device according to one embodiment of the present invention.
Figure 37:
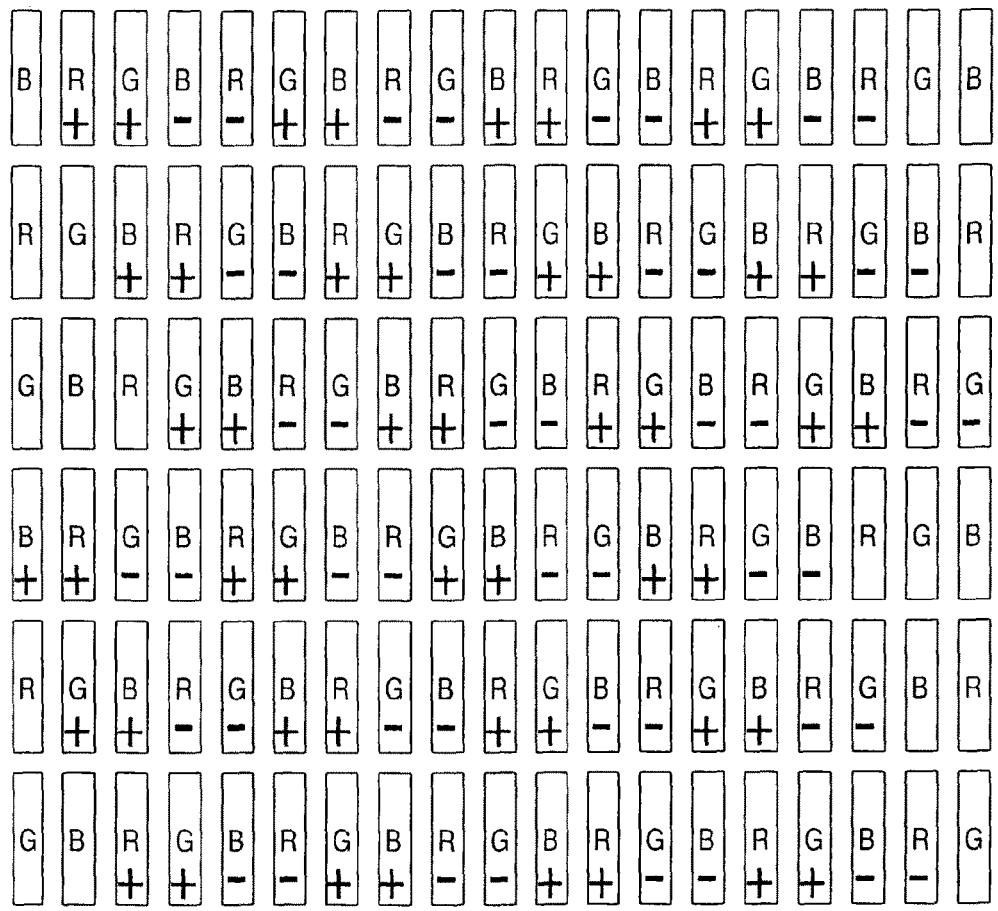
FIG. 37 is a diagram schematically showing signal polarities of respective pixels within the same field of a stereoscopic display device according to one embodiment of the present invention.

Further, in order to suppress flicker or cross talk in a liquid crystal display device, a polarity reversing drive for each field is frequently performed. However, when a color arrangement is different from an ordinary one like this embodiment, particularly when displaying is performed with a single color at the flat display time where the beam controlling element is invalidated, color flicker may occur. At a stereoscopic display time, since a set of pixel rows which can be seen varies according to a position of a viewpoint, flicker occurs partially in some case, even if a simple signal line inversion drive (a V line inversion drive) or the like is conducted. In order to prevent occurrence of flicker, it is desirable that pixels with the same color closest to each other in adjacent rows are driven in the same field by image signals with different polarities, or pixels closest to each other in the same column are driven in the same field by image signals with different polarities, and it is further desirable that both the operations are performed. That is, such a disposition that an oblique direction along which colors are arranged and another oblique direction along which the same polarities are arranged are crossed, or such as a scanning line inversion drive (H line inversion drive) is suitable. As examples showing an arrangement of signal polarities in the same field, there are such patterns as shown in FIG. 36 to FIG. 37. In FIG. 37, each two pixels closest to each other in the same column have the same polarity, but pixels with the same color closest to each other in the same column have different polarities even in this case so that an effect or advantage can be expected to some extent.

Figure 23:
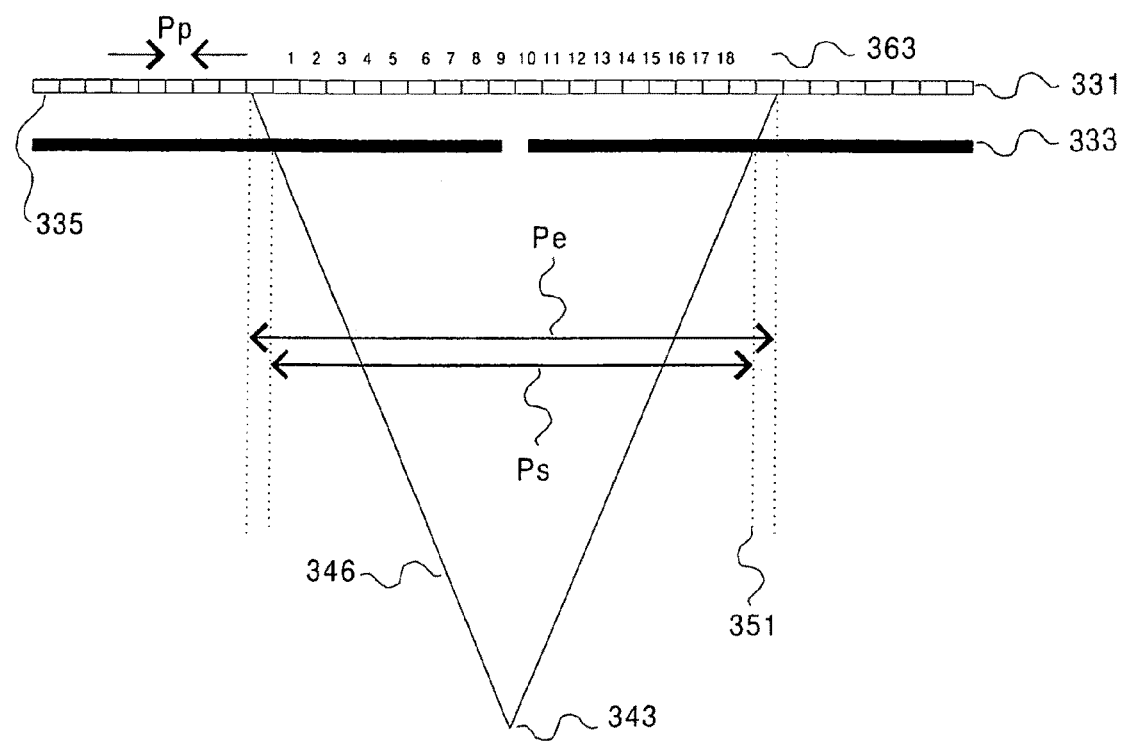
FIG. 23 is an illustrative diagram showing a positional relationship among pixels in an integral photography system, an elemental image and a parallax barrier.
Figure 24:
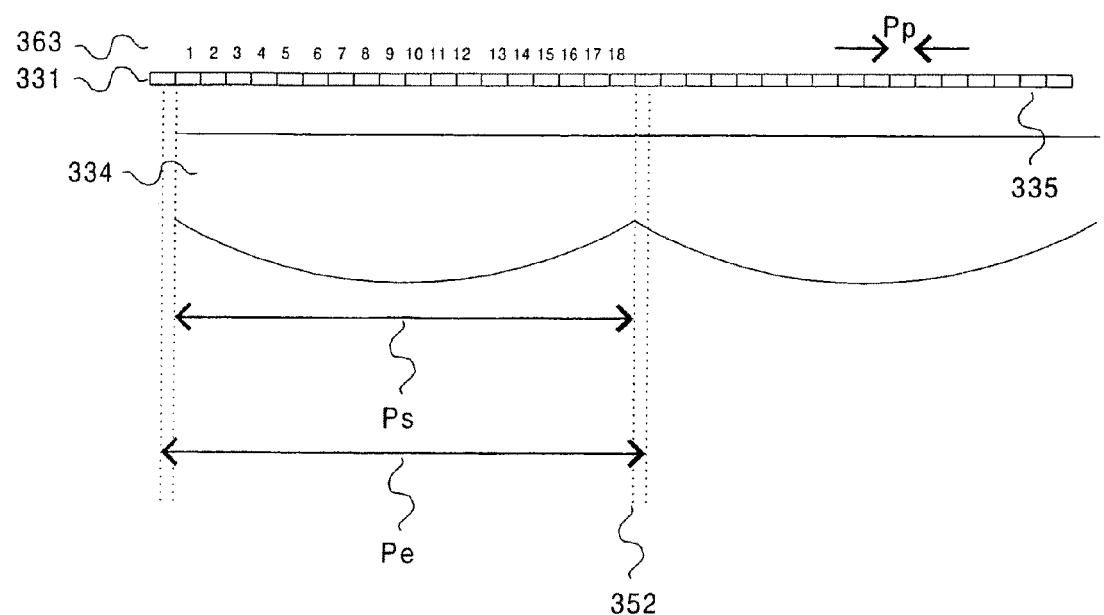
FIG. 24 is an illustrative diagram showing a positional relationship among pixels in an integral photography system, an elemental image and a parallax barrier according to the second embodiment of the present invention.
Figure 25:
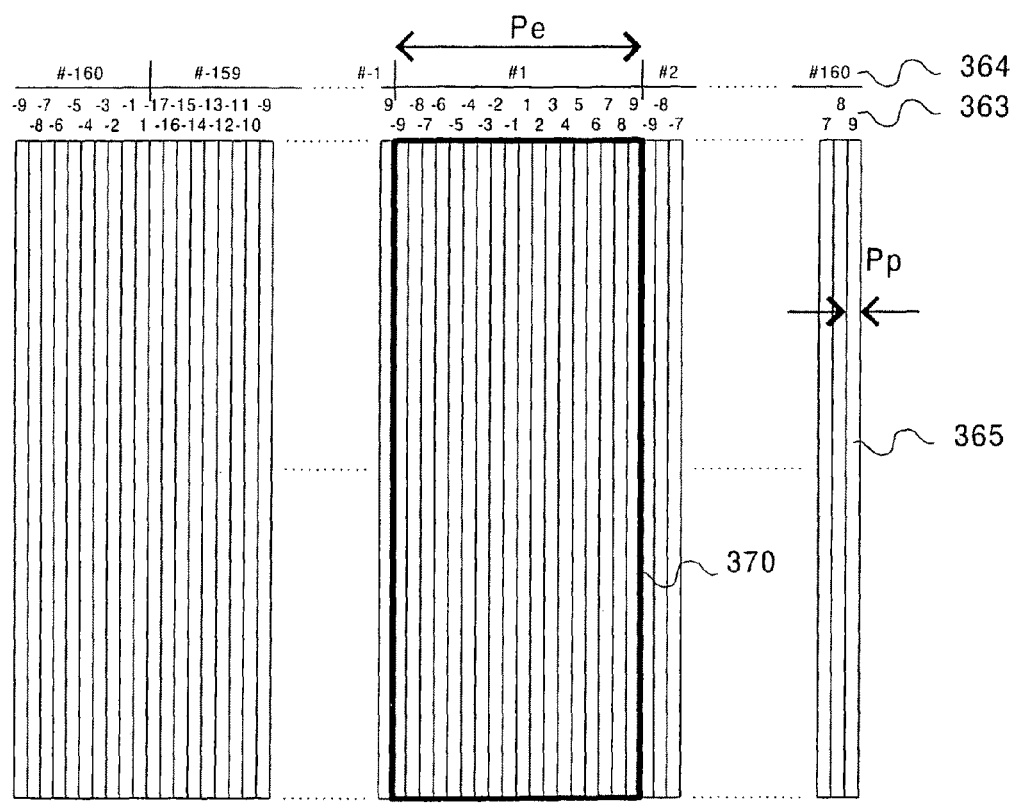
FIG. 25 is an illustrative diagram showing an image arranging method of a stereoscopic display device of an integral photography system according to the second embodiment of the present invention.
Figure 26:
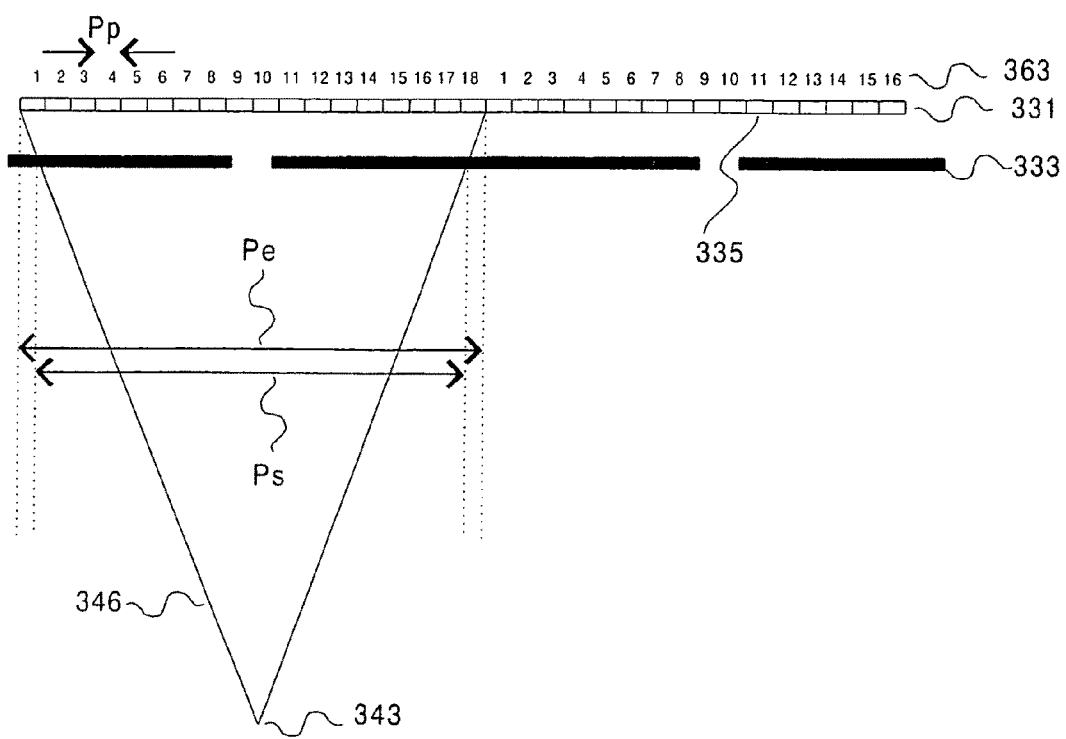
FIG. 26 is an illustrative diagram showing a positional relationship among pixels, an elemental image and a parallax barrier of a multiview system.

Even in this embodiment, explanation will be made, assuming that, as one example of a case that counting is made based upon a pixel group of the minimum unit forming a square, the number of pixels in a flat display device is 1920 in a lateral direction (a horizontal direction) and is 1200 in a longitudinal direction (a vertical direction) and a pixel group of each minimum unit includes pixels of red, green and blue (RGB). FIG. 23 or FIG. 24 is a diagram schematically showing a horizontal section of a display portion of a stereoscopic display device. As shown herein, a pitch Ps (period) of the slit 333 or the lenticular lens of the lenticular sheet 334 in a horizontal direction is set to a size of an integer number of pixels correctly. That is, a center axis 351 passing through the center between respective slits 333 or a reference axis 353 passing through a boundary between adjacent lenticular lenses of the lenticualr sheet 334 passes through a pixel boundary. An integer number of pixels are arranged in region corresponding to a space between the center axes 351 or the reference axes 352, and a pitch Ps (period) of the center axes 351 or the reference axes 352 in a horizontal direction is set to a constant value. FIG. 25 is a diagram schematically showing the front of the display portion of the stereoscopic display device. In the example shown here, the pitch Ps is set to a size of 18 pixels. A gap between the display plane 331 and the parallax barrier 332, 334 of the display device is effectively set to about 2 mm considering the refractive index of glass substrate or lens material. Thus, such a constitution that the pitch Ps of the parallax barrier (not the pitch Ps which can be seen due to a difference in distance but an actual pitch Ps of the parallax barrier) is integer times the pixel-to-pixel pitch Pp is the one-dimensional integral photography, as explained above. On the other hand, such a constitution that the elemental image pitch Pe is integer times the pixel-to-pixel pitch Pp like the horizontal section shown in FIG. 26 is generally classified to the multiview system.

Figure 27:
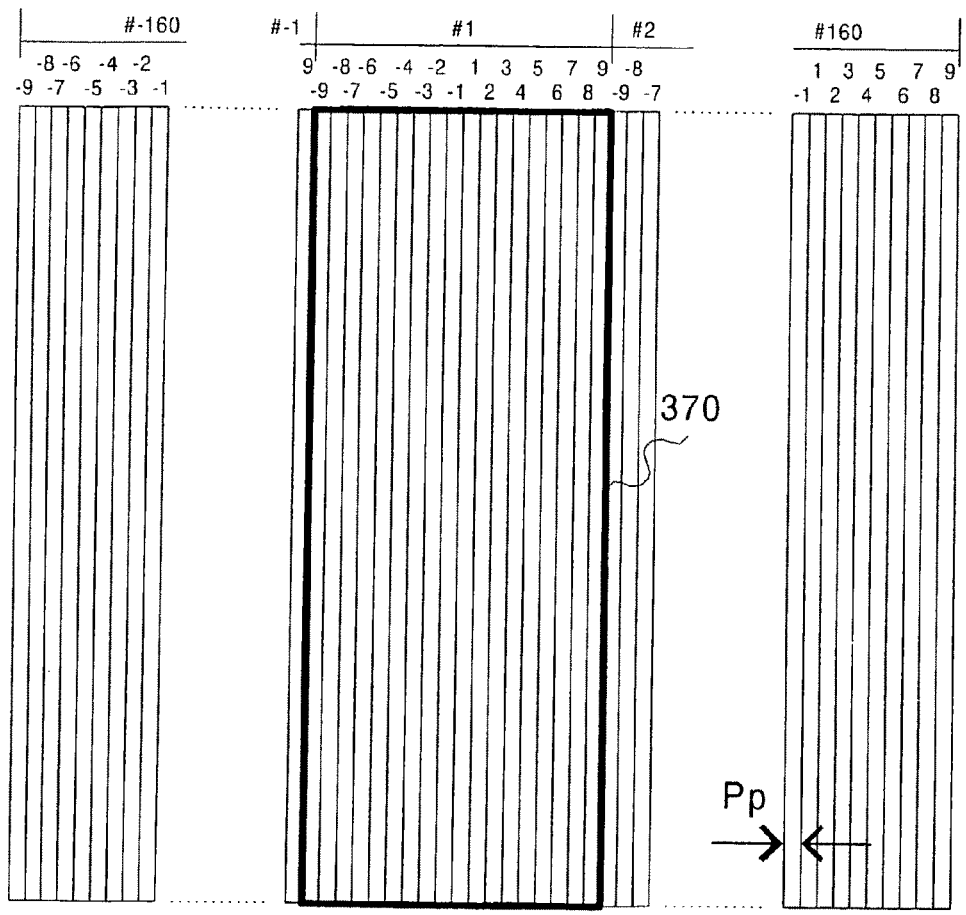
FIG. 27 is an illustrative diagram showing an image arranging method of a stereoscopic display device of the multiview system according to the second embodiment of the present invention.

FIG. 25 and FIG. 27 are conceptual diagrams of arrangement methods of images on display planes of the display devices in the IP system and the multiview system, obtained when a display portion of a stereoscopic display device has been viewed from the front thereof. The display plane of the display device is divided to elemental images 370 corresponding to respective apertures (opening portions of a parallax barrier), and each elemental image 370 is constituted of pixel columns comprising 18 columns or 19 columns in the IP system. The total number of pixel columns which can be allocated with a parallax is 5760, because each pixel comprises three sub-pixels and a positional shift occurs between two rows, the number of apertures is 320 (in FIG. 25 and FIG. 27, the range of aperture numbers described in a region shown by reference numeral 364 is a range indicated by #−160 to #−1, and #1 to #160), and the aperture pitch Ps is equal to a size of a 18-pixels width. In FIG. 25 and FIG. 27, in each pixel column 365, corresponding parallax numbers (in this example, corresponding to 34 directions of parallax numbers −17 to −1 and 1 to 17) are shown as items in a region indicated by a reference numeral 363. An elemental image indicated by aperture number #1 comprises columns of 18 parallaxes of parallax numbers −9 to −1 and 1 to 9, and an elemental image indicated by aperture number #−159 comprises columns of 18 parallaxes of parallax numbers −17 to −1 and 1 to 18. Since the width of the elemental image is slightly larger than the width of the 18-pixels column, when the boundary of the elemental image is caused to match with the closest pixel row boundary (a normal A-D conversion), the number of pixel columns in the aperture is 18 in most apertures, but aperture corresponding to 19 columns also occur. The parallax number range in the aperture is shifted one by one from the aperture number corresponding to 19 columns. The aperture numbers corresponding to 19 columns are #10, #30, #49, #69, #88, #107, #127, and #146 (and their minus numbers) (in case of the viewing distance of 700 mm).

In FIG. 28, aperture numbers (Slit Number in Table) indicating start and end of arrangement of parallax images in each direction are shown. In this Table, pixel row numbers at corresponding 3-D display time, and column numbers and pixel column numbers of the flat display device are also shown.

Incidentally, unlike the IP system, in the multiview system, the elemental image widths all comprise a width of 18 pixel columns, as shown in FIG. 27, and parallax numbers of −9 to −1 and 1 to 9 are similarly arranged in all of the elemental images.

A Table (mosaic, the number of parallax: 18) shown in FIG. 31B is a table that, when the elemental image pitch or the parallax barrier pitch is 18 times the pixel pitch and a liquid crystal panel having the number of pixels defined by a normal standard is used for the flat image display portion, excess rows or columns may occur. Like the first embodiment, after an excess region is allocated symmetrically, the excess region may be utilized in the same manner as shown in FIGS. 32A, 32B and 32C. In order to make symmetrical, in the multiview system, such a constitution can be employed that boundaries of all the elemental images are set in a middle between pixel centers of two pixels closest to each other in an oblique direction of rows adjacent in a vertical direction, and the total number of elemental images is even. In the IP system, such a constitution may be employed that the total number of elemental images is even and the boundary of the elemental image at the central position on the whole display plane in a lateral direction is set at a middle between pixel centers of two pixels closest to each other in an oblique direction of rows adjacent in a vertical direction. Incidentally, since the arrangement in this embodiment is not the delta arrangement, "in a middle between pixel centers of two pixels closest to each other in an oblique direction" is the same as "in an middle between pixel centers of two pixels closest in a lateral direction".

As described above, according to the stereoscopic display devices according to the embodiments of the present invention, it is made possible to simultaneously satisfy such a condition that, while moire or color moire is suppressed, an aspect ratio of a pixel is set to 1 and pixels are formed in a square arrangement so that color data or information is prevented from lacking for each parallax, and such a condition that a resolution or an image quality does not vary largely at a time of switching between the flat image display and the stereoscopic image display.

The present invention is not limited to the above embodiments as they are, but it can be embodied in a practical stage by modifying constituent elements without departing from the spirit and scope of the invention.

Various inventions can be constituted by properly combining a plurality of constituent elements disclosed in the above embodiments. For example, some constituent elements of all the constituent elements shown in the embodiments can be cancelled. Further, constituent elements over a different embodiment may be combined properly.

The invention claimed is:

1. A stereoscopic display device comprising:
a display device comprising red, green and blue pixels arranged in a lateral direction in the same row alternatively, the pixels being disposed within a display plane;
a beam controlling element disposed in front of the display device and having one of a plurality of apertures or a plurality of lenses having an optical opening portion extending linearly in a vertical direction, the controlling element controlling beam directions from the pixels to form elemental images corresponding to the respective apertures or lenses of the beam controlling element;
means for, by an effective pixel with a generally square shape comprising 6n×18n (n=1, 2, 3, . . . ) pixels arranged in a vertical direction and in a horizontal direction, applying the same parallax image information to 3n pixels arranged in a straight line in the same vertical direction as an extending direction of the opening portion of the beam controlling element and in the same position in a horizontal direction to display image signals as the total of 36n parallaxes at a stereoscopic image display time; and
means for, by an effective pixel with a generally square shape comprising 3 pixels of red, green and blue arranged laterally, ignoring a lateral positional deviation by ⅙ an effective pixel width and regarding the effective pixel as a square arrangement to display image signals at a flat image display time where the beam controlling element has been detached or a function thereof has been invalidated,
wherein:
a vertical pixel pitch of the pixels arranged in one row in a lateral direction is three times a lateral pixel pitch of the pixels;
pixels of two adjacent rows in a vertical direction are arranged such that lateral positions of the pixels of a first one of the two adjacent rows are shifted, relative to the pixels in a second one of the two adjacent rows, by ½ of the lateral pixel pitch;
pixels of even or odd number rows in the same column in the vertical direction are arranged so that the colors of the pixels of even or odd number rows in the same column in the vertical direction alternate in red, green, and blue; and
a lateral pitch of the elemental images is substantially equal to 18n (n=1, 2, 3 . . . ) times the lateral pixel pitch, and a lateral pitch of the apertures or lenses is smaller than 18n times the lateral pixel pitch.

2. A stereoscopic display device according to claim 1, wherein boundaries of all the elemental images are set at middles between two pixel centers of the pixels closest to each other in an oblique direction of rows adjacent in a vertical direction, and the total number of the elemental images are even number and the elements images are arranged symmetrically to left and right within the whole display plane.

3. A stereoscopic display device according to claim 1, wherein only two pixels developing the same color are arranged so as to be continuously adjacent to each other in an oblique direction.

4. A stereoscopic display device according to claim 1, wherein, when the number of pixels in a vertical direction is not a multiple of 6 or when the number of the effective pixels in the vertical direction at a stereoscopic display time is not coincident with a display standard, an excess pixel row portion is uniformly arranged at upper portion and a lower portion or is collectively arranged at an upper portion or a lower portion, a pattern figure serving as a guide for a stereoscopic view is displayed at the excess portion.

5. A stereoscopic display device according to claim 1, wherein, when the number of pixels in the lateral direction is not a multiple of 18 or when the number of the effective pixels in the lateral direction at a stereoscopic display time is not coincident with a display standard, an excess pixel column portion is uniformly arranged symmetrically to left and right so that a pattern figure serving as a guide for stereoscopic view or an image with burred images at end portions thereof is displayed on the excess portion.

6. A stereoscopic display device according to claim 1, wherein pixels with the same color closest to each other in adjacent rows in the display device are driven in the same field by image signals with different polarities.

7. A stereoscopic display device according to claim 1, wherein pixels closest to each other in the same column in the display device are driven in the same field by image signals with different polarities.

8. A display method using a stereoscopic display device according to claim 1, the display method comprising:

by an effective pixel with a generally square shape comprising $6n \times 18n$ ($n = 1, 2, 3, \ldots$) pixels arranged in a vertical direction and in a horizontal direction, applying the same parallax image information to $3n$ pixels arranged in a straight line in the same vertical direction as an extending direction of the opening portion of the beam controlling element and in the same position in a horizontal direction to display image signals as the total of $36n$ parallaxes at a stereoscopic image display time, and by an effective pixel with a generally square shape comprising 3 pixels of red, green and blue arranged laterally, ignoring a lateral positional deviation by $\frac{1}{6}$ an effective pixel width and regarding the effective pixel as a square arrangement to display image signals at a flat image display time where the beam controlling element has been detached or a function thereof has been invalidated are performed.

* * * * *